United States Patent
Murayama et al.

(10) Patent No.: US 8,160,152 B2
(45) Date of Patent: Apr. 17, 2012

(54) MOVING IMAGE DECODING APPARATUS AND MOVING IMAGE CODING APPARATUS

(75) Inventors: Shu Murayama, Tokyo (JP); Hiroshi Homma, Tokyo (JP); Kunio Shibata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1681 days.

(21) Appl. No.: 11/482,893

(22) Filed: Jul. 10, 2006

(65) Prior Publication Data
US 2007/0217519 A1 Sep. 20, 2007

(30) Foreign Application Priority Data
Mar. 1, 2006 (JP) .................... 2006-55137

(51) Int. Cl.
*H04B 1/66* (2006.01)
(52) U.S. Cl. ......... 375/240.25; 375/240.26; 375/240.27; 375/240.28; 382/233; 382/235; 382/234; 382/232
(58) Field of Classification Search ............. 375/240.25, 375/240.26, 240.27, 240.28; 382/233, 235, 382/234, 232
See application file for complete search history.

(56) References Cited

U.S. PATENT DOCUMENTS

| | | | | |
|---|---|---|---|---|
| 5,841,475 A * | 11/1998 | Kurihara et al. | ......... | 375/240.15 |
| 6,252,907 B1 * | 6/2001 | Hwang | ............... | 375/240.25 |
| 6,999,673 B1 * | 2/2006 | Kadono | ............ | 386/264 |
| 2002/0034253 A1 * | 3/2002 | Nagai et al. | ............. | 375/240.25 |

FOREIGN PATENT DOCUMENTS

| | | | |
|---|---|---|---|
| JP | 7-322248 A | 12/1995 | |
| JP | 11-27645 A | 1/1999 | |
| JP | 2001-103479 A | 4/2001 | |
| JP | 2002-247578 A | 8/2002 | |
| JP | 2003-32689 A | 1/2003 | |

* cited by examiner

*Primary Examiner* — Shawn An
(74) *Attorney, Agent, or Firm* — Birch, Stewart, Kolasch and Birch, LLP

(57) ABSTRACT

A data storage unit (103) stores an image frame in which an image frame which consists of coded data having a data loss or error received by a receiving unit (100) and complementary coded data which is received by receiving unit at a later time are rearranged into normal sequence. A redecoding unit (105) decodes the image frame stored in the data storage unit (103) with reference to one or more already-decoded image frames required for the decoding, and stores the decoded image frame in a frame additionally-storage unit (104). A decoding unit (101) decodes an image frame with reference to an image frame stored in either a frame storage unit (102) or the frame additionally-storage unit 104 according to a command from a control unit (106).

18 Claims, 14 Drawing Sheets

MOVING IMAGE DECODING APPARATUS AND MOVING IMAGE CODING APPARATUS

BACKGROUND OF THE INVENTION

1. Field of the Invention

The present invention relates to a moving image decoding apparatus which receives and decodes coded data, and a moving image coding apparatus which codes image data and transmits coded data. More particularly, it relates to a moving image decoding apparatus which temporarily starts decoding coded data transmitted thereto and decodes the coded data again when they become complete, and replaces the previously-decoded data with the newly-decoded data in a case where an error occurs in the coded data transmitted thereto, some data are missing from the coded data, or there occur fluctuations in the transmission time of the coded data in a transmission line, and therefore some of all the coded data are not transmitted thereto at the time when it has to complete the reception of the coded data required and to start decoding the coded data at a predetermined timing in order to perform display of the decoded data normally, thereby reducing the degradation in the image quality which is caused by the decoding of subsequent coded data, and a moving image coding apparatus which is suited to the moving image decoding apparatus.

2. Description of Related Art

When decoding coded data received via a network, such as the Internet, related art moving image decoding apparatus need to take into consideration mixture of an error into the coded data, and a data loss from the coded data, change in the sequence of the coded data, etc. Therefore, related art moving image decoding apparatus carry out processes of, for example, temporarily buffering the coded data before decoding them, when an error occurs in the coded data or some data are missing from the coded data, making a request of the transmit side for retransmission of the coded data, or, when there is a change in the sequence of the coded data which have reached, rearranging the coded data into normal sequence using a buffer of the receive side.

Although TCP (Transmission Control Protocol) is used as a protocol for enabling related art moving image decoding apparatus to carry out such processes, it is unsuitable for uses, such as transmission of moving images in real time since the time of arrival of retransmitted packets is not guaranteed. On the other hand, while the immediacy is secured using protocols, such as RTP (Real-time Transport Protocol) and UDP (User Datagram Protocol), the transmit side adds an error correction code to each coded data instead of performing control of retransmission of coded data having a loss or error.

The receive side can deal with fluctuations in the timing of arrival of coded data and change in the sequence of the coded data by buffering them. However, in general, the receive side cannot buffer coded data for a long time in reception of a moving image in real time since the buffering time is added to a delay which occurs between the transmission of the coded data at the transmit side and the playback of the coded data.

As a method of solving the problem, there has been provided a receiving/decoding system for receiving and decoding video packets disclosed in, for example, patent reference 1. When an error or data loss occurs in received coded data, the receiving/decoding system decodes the coded data continuously and also stores subsequent coded data temporarily. After that, when the coded data, which has been transmitted with an error or data loss occurring, are retransmitted to the receiving/decoding system which has made a request for retransmission of the coded data, the receiving/decoding system reads the above-mentioned coded data stored temporarily therein and redecodes the coded data. The decoder of the receiving/decoding system holds its decoding state at that time so that it can restart decoding coded data starting from the above-mentioned coded data in which an error or data loss has occurred. When restarting decoding coded data starting from the above-mentioned coded data, the decoder returns to the decoding state in which it can redecode all coded data which have been received after the coded data having an error or data was received.

[Patent reference 1] JP,2002-247578,A (see paragraph 0015)

Since the receiving/decoding system disclosed in above-mentioned patent reference 1, which is provided as a related art moving image decoding apparatus, goes back in time to the time when coded data having an error or data loss was received from the time when correct coded data corresponding to the coded data having an error or data loss is received so as to redecode all coded data which the receiving/decoding system has received since the time when the coded data having an error or data loss was received, a larger-than-usual amount of computations is performed. Therefore, a problem is that when the related art moving image decoding apparatus cannot decode inputted coded data about a moving image at a high speed because of the processing capability of the decoder, the related art moving image decoding apparatus cannot carry out the process of receiving and decoding coded data at a predetermined timing and therefore the display of the moving image is disturbed.

Another problem is that when a long delay time is introduced into transmission of coded data by the transmission line, and it takes several frame times for correct coded data which is transmitted in response to, for example, a request for retransmission of the coded data to reach the related art moving image decoding apparatus, even when the correct coded data is received in the meantime, a large buffer for storing all the received data and a high-speed decoder which can decode the correct coded data at a high speed so as to offset the delay of several frame times long are needed.

The above-mentioned reference does not present any clear standard about the storage time of the buffer and the processing capability of the decoder which make it possible for the related art moving image decoding apparatus to carry out the process of receiving and decoding coded data at a predetermined timing, and only discloses an ambiguous idea showing that the speeding up of the process of receiving and decoding coded data makes it possible for the related art moving image decoding apparatus to carry out the process at the predetermined timing.

SUMMARY OF THE INVENTION

The present invention is made in order to solve the above-mentioned problems, and it is therefore an object of the present invention to provide a moving image decoding apparatus which, when receiving image data coded using a moving image coding method including inter frame prediction by way of a transmission line having errors, and decoding the image data, decodes the image data using coded data which is transmitted thereto after a delay in response to, for example, a request for retransmission of the coded data without lengthening the time required to decode the image data since it is received, by utilizing the time interval which elapses until it is referred to at the time of the decoding of another image frame after decoded, thereby reducing the degradation in the quality of the decoded image data, and a moving image coding apparatus which is suited to the moving image coding apparatus.

In accordance with the present invention, there is provided a moving image decoding apparatus including: a receiving unit for receiving a plurality of types of image frames from a transmission line, and for notifying receiving state information about occurrence of a data loss or error in coded data which constitute each of the image frames; a decoding unit for decoding each of the plurality of types of image frames received by the receiving unit by referring to one or more image frame which have been decoded and which are required for the decoding; a data storage unit for storing both an image frame which consists of coded data having a data loss or error, which is received by the receiving unit, and complementary coded data, which is received by the receiving unit at a later time and which is used for complementing the coded data having a data loss or error, according to a command from a below-mentioned control unit to which the receiving state information has been notified by the receiving unit, for rearranging the coded data and the complementary coded data into normal sequence to generate normal coded data, and for storing an image frame which consists of the normal coded data; a redecoding unit for decoding the image frame stored in the data storage unit by referring to one or more image frames which have been decoded and which are required for the decoding; a frame storage unit for storing at least two already-decoded image frames each of which is an image frame which has been decoded by either the decoding unit or the redecoding unit, and each of which is referred to when a subsequent image frame is decoded; a frame additionally-storage unit for storing at least one already-decoded image frame which is an image frame which has been decoded by either the decoding unit or the redecoding unit and which is referred to when a subsequent image frame is decoded; and the control unit for providing the command to the data storage unit on the basis of the receiving state information notified thereto by the receiving unit, and for instructing both the decoding unit and the redecoding unit to refer to an already-decoded image frame and to store a decoded image frame in either the frame storage unit and the frame additionally-storage unit.

Therefore, the present embodiment offers an advantage of being able to improve the quality of a decoded image frame to be referred to in which a loss or an error has occurred, and which is to be referred to at the time of the decoding of another image frame, and to improve the quality of image frames which are decoded with reference to the image frame to be referred to.

Further objects and advantages of the present invention will be apparent from the following description of the preferred embodiments of the invention as illustrated in the accompanying drawings.

DETAILED DESCRIPTION OF THE PREFERRED EMBODIMENTS

Embodiment 1

Figure 1:
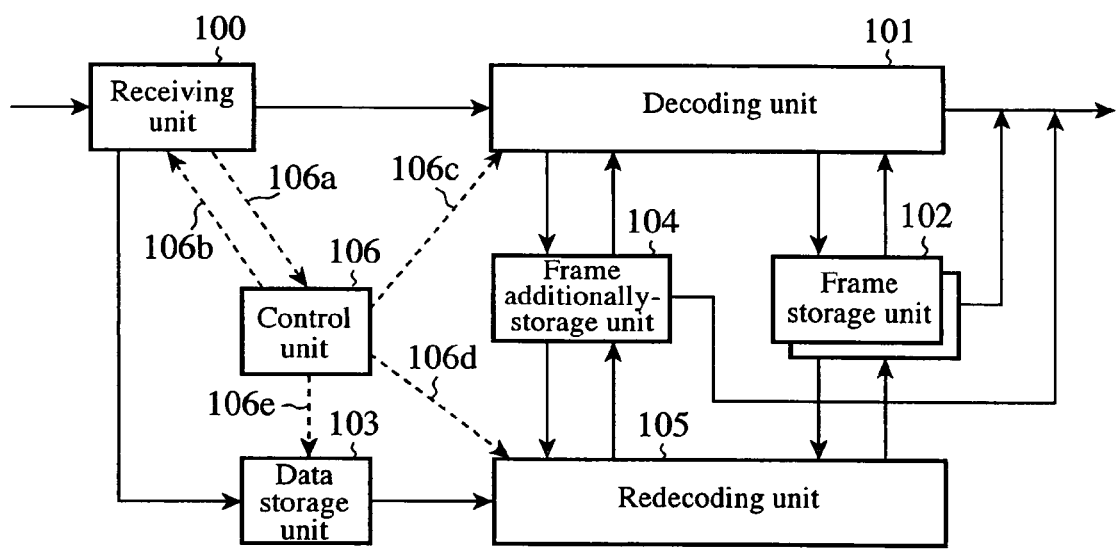
FIG. 1 is a block diagram showing the structure of a moving image decoding apparatus in accordance with embodiment 1 of the present invention.

FIG. 1 is a block diagram showing the structure of a moving image decoding apparatus in accordance with embodiment 1 of the present invention. The moving image decoding apparatus shown in FIG. 1 is provided with a receiving unit 100, a decoding unit 101, a frame storage unit 102, a data storage unit 103, a frame additionally-storage unit 104, a redecoding unit 105, and a control unit 106.

The receiving unit 100 receives a plurality of types of image frames from a transmission line, and notifies reception state information about a data loss or error in coded data which constitutes the image frames to the control unit 106. The decoding unit 101 decodes the plurality of types of image frames received by the receiving unit 100 by referring to one or more image frames which have been decoded and which are required for the decoding of the plurality of types of image frames. The data storage unit 103 stores an image frame which consist of coded data having a data loss or error which has been received by the receiving unit 100 and complementary coded data which is received by the receiving unit 100 at a later time and which is used for complementing the coded data having a data loss or error according to a command from the control unit 106 to which the reception state information has been notified by the receiving unit 100, rearranges the coded data and complementary coded data into normal sequence, and stores an image frame which consists of the rearranged correct coded data.

The redecoding unit 105 refers to one or more image frames which have been decoded and which are required for decoding so as to decode the image frame stored in the data storage unit 103. The frame storage unit 102 stores at least two decoded image frames each of which is an image frames which has been decoded by either the decoding unit 101 or the redecoding unit 105 and each of which is to be referred to when a subsequent image frame is decoded. The frame additionally-storage unit 104 stores at least one decoded image frame which is an image frame which has been decoded by either the decoding unit 101 or the redecoding unit 105 and which is to be referred to when a subsequent image frame is decoded.

The control unit 106 instructs the data storage unit 103 to store an image frame which consists of coded data having a data loss or error which has been received by the receiving unit 100 and complementary coded data which is received by the receiving unit 100 at a later time and which is used for complementing the coded data having a data loss or error according to the receiving state information which has been notified thereto by the receiving unit 100. The control unit 106 further instructs the data storage unit 103 to rearrange the coded data and complementary coded data into normal sequence, and to store a vide frame which consists of the rearranged correct coded data, and also instructs both the decoding unit 101 and redecoding unit 105 to refer to one or more already-decoded image frames to be referred to and to store a decoded image frame in either the frame storage unit 102 or the frame additionally-storage unit 104.

The control unit 106 makes the data storage unit 103 store either an image frame to be referred to when each of the decoding unit 101 and redecoding unit 105 performs decoding, the image frame being included in the image frame which consists of coded data having a data loss or error, or an image frame which each of the decoding unit 101 and redecoding unit 105 can decode independently without referring to preceding and subsequent image frames when decoding the image frame.

When the receiving unit 100 receives complementary coded data, the control unit 106 instructs the decoding unit 101 to stop decoding with reference to one or more already-decoded image frames.

Next, the operation of the moving image decoding apparatus in accordance with this embodiment of the present invention will be explained.

From the transmission line, inter-frame-prediction coded image data is inputted to the receiving unit 100, and is then outputted to the decoding unit 101. A part of this coded data is also outputted to the redecoding unit 103 after it is stored in the data storage unit 103 according to a command from the control unit 106. Each of the decoding unit 101 and redecoding unit 105 has a function of decoding inter-frame-prediction coded data, and, when or after decoding the coded data, and writes the decoded image frame into one or both of the frame storage unit 102 and frame additionally-storage unit 104. The decoded image frame is outputted from the decoding unit 101 directly to a display unit (not shown) located at a later stage, or is outputted from the frame storage unit 102 or frame additionally-storage unit 104 to the display unit located at a later stage.

The control unit 106 acquires information 106a, such as information about an error in the received data, from the receiving unit 100, and outputs a coded data delivery command 106b for delivering coded data to the data storage unit 103 to the receiving unit 100 on the basis of the information 106a. The control unit 106 also outputs switching commands 106c and 106d each for selecting, as a source or destination from or into which image frames are to be read or written, either the frame storage unit 102 or the frame additionally-storage unit 104, to the decoding unit 101 and redecoding unit 105, respectively, and further outputs an output command 106e for outputting coded data to the redecoding unit 105 to the data storage unit 103.

First, a case where no error is included in the input coded data or no data is missing from the input coded data, and therefore the coded data can be decoded normally, that is, a case where coded data which has been inter-frame-prediction coded normally is received and decoded by the moving image decoding apparatus will be explained.

Coded data which constitute image frames are furnished to the decoding unit 101 by way of the receiving unit 100, and the decoding unit 101 decodes the coded data on a frame-by-frame basis. When one or more other image frames which have been decoded are needed at this time, the decoding unit 101 decodes the coded data with reference to the one or more already-decoded image frames stored in the frame storage unit 102, and outputs the decoded data to the display unit located at a later stage. When each decoded image frame is an image frame to be referred to at the time of the decoding of subsequent image frames, the decoding unit 101 stores each decoded image frame in the frame storage unit 102.

Next, a relation between the decoding unit 101 at the time of the decoding of coded data about each image frame and the frame storage unit 102 from which one or more already-decoded image frames are referred to will be explained in detail.

Figure 2:
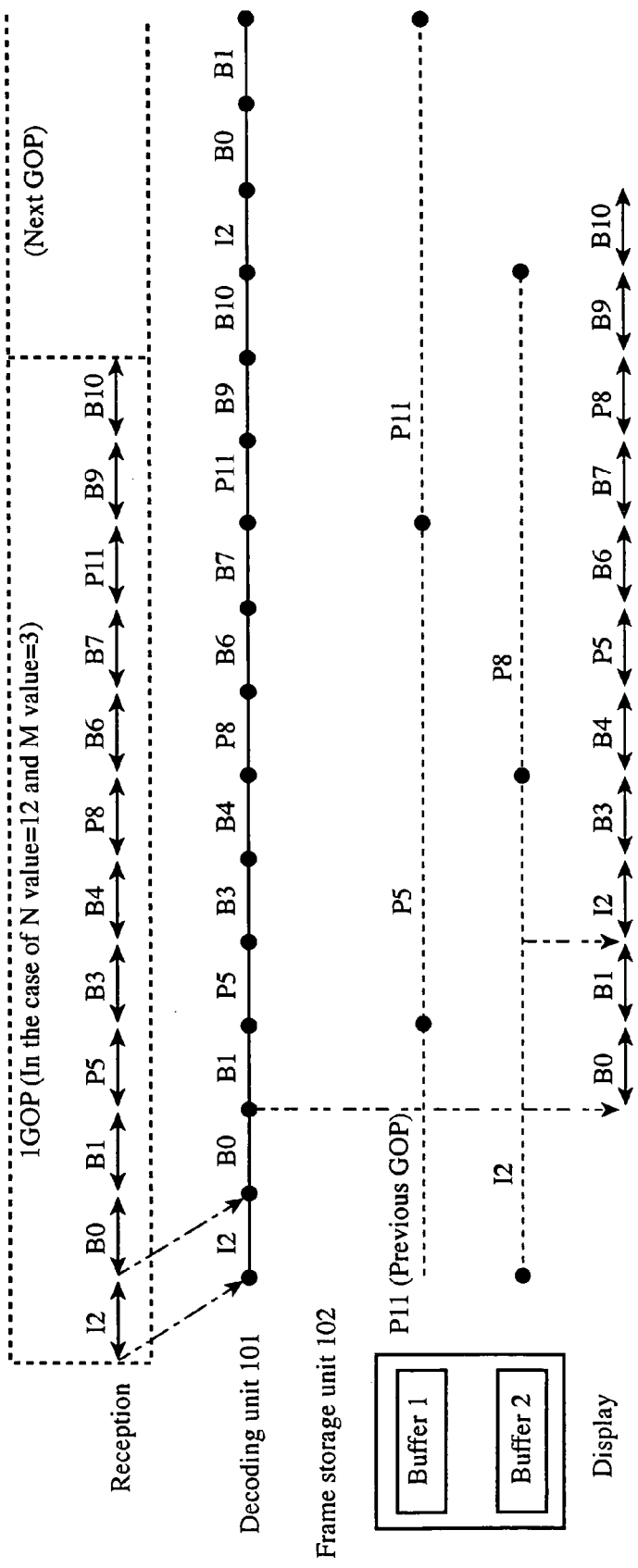
FIG. 2 is a diagram explaining the operation of a decoding unit and a frame storage unit when the moving image decoding apparatus in accordance with embodiment 1 of the present invention decodes data which is coded using a typical inter-frame-prediction coding method.

FIG. 2 is a diagram explaining the operation of the decoding unit 101 and frame storage unit 102 at the time of the decoding of coded data which has been coded using a typical inter-frame-prediction coding method. In FIG. 2, the horizontal axis is a time axis. A display time per one frame is referred to as one frame time from here on. For example, in typical TV broadcasting, since about 30 frames are displayed during a time period of 1 second, one frame time is about 33 msec.

In FIG. 2, image frames which are being processed by the decoding unit 101, and image frames which are being held by the frame storage unit 102 are shown below the time axis, and a display timing at which the image frames are displayed is shown in the bottom line. For the sake of simplicity, assume that the decoding of each of all the image frames takes one frame time, and the frame storage unit 102 has two buffers (i.e., buffer 1 and buffer 2) for storing at least two decoded image frames therein.

For example, when MPEG(Moving Picture Experts Group)2 Video (ISO/IEC 13818-2) is used as the coding method, image frames are divided into three "frame (picture) types" of frames, i.e., I frames, P frames, and B frames. Several or several tens of image frames starting from each I frame constitutes a group called GOP (Group of Picture). Each I frame can be coded or decoded independently without any reference to the previous and the next image frame when coded or decoded. A P frame has to be coded or decoded with reference to the previous I or P image frame when coded or decoded. A B frame has to be coded or decoded with reference to the previous and the next I or P image frame when coded or decoded. That is, since the decoding of a B frame needs two reference images, in order to comply with this coding method, the frame storage unit 102 needs to have two buffers which can store at least two image frames as shown in FIG. 2.

In FIG. 2, letters of the alphabet in reference strings, such as I2 and B0, denote the frame (picture) types of frames, respectively, numbers in the reference strings denote their display turns, an N value shows the number of frames included 1 GOP, i.e., the length of intervals at which I frames appear (measured in the number of frames), and an M value shows the length of intervals at which I or P frames appear (measured in the number of frames). In the example of FIG. 2, the N value is 12, that is, 1 GOP consists of 12 image frames, and the M value is 3, that is, an I or P frame appears every three frame.

In the case of this example of FIG. 2, although image frames are inputted to the decoding unit 101 in order of an I frame (I2), a B frame (B0), a B frame (B1), . . . , and are decoded by the decoding unit, the display of them begins from the B0 frame. In the example of FIG. 2, the I2 frame is buffered for a while after decoded first, and, after that, the I2 frame itself is displayed and is buffered for a while. While the I2 frame is buffered, it is referred to when other image frames are decoded. To be more specific, assuming that the display order is the same as the order of coding, since the I2 frame is referred to at the time of the decoding of the previous B0 and B1 frames, and the next B3, B4, and P5 frames, the I2 frame is buffered until the decoding of the B4 frame whose turn of the decoding is the last in these frames is completed. In this example of FIG. 2, since one of the two buffers (e.g., buffer 1) is occupied by the previous GOP (not shown) at the time of the decoding of the I2 frame, the decoded result of the I2 frame is stored in the other buffer (e.g., buffer 2).

Similarly, since the P5 frame is also referred to when each of the B3, B4, B6, and B7 frames is decoded, the P5 frame is buffered until the B7 frame which is the last one of these frames is decoded after the P5 frame itself is decoded. Also at this time, the decoded image data about the P5 frame is stored in an empty one of the buffers (e.g., buffer 1) and is referred to at the time of the decoding of above-mentioned each B frame.

When thus receiving the inputted coded data normally, since the moving image decoding apparatus performs decoding processing using only the decoding unit 101 and frame storage unit 102 which can store two image frames therein, the moving image decoding apparatus outputs the decoded image frames to the display unit located at a later state without having to use the data storage unit 103, redecoding unit 105, and frame additionally-storage unit 104.

Also when the buffering of the inputted coded data is performed by a stage (not shown) located before the receiving unit 100, and absorption of fluctuations in the arrival timing of the inputted coded data and a changing of the order of the inputted coded data which have arrived at the moving image decoding apparatus are correctly performed, the moving image decoding apparatus performs decoding processing using only the decoding unit 101 and frame storage unit 102, as in the case where it receives the inputted coded data normally.

Next, a case where the received coded data have an error or data loss will be explained.

In this case, the coded data are not inputted to the receiving unit 100 in right order and at a correct timing regardless of whether or not the coded data are buffered by a previous stage located before the receiving unit 100. Even if there is provided a previous stage located before the receiving unit 100 for buffering coded data, the buffering using the previous stage cannot absorb fluctuations in the arrival timing of coded data which wander and arrive at the moving image decoding apparatus after a delay which exceeds a time period during which the coded data is buffered by the previous stage, and therefore the inputted coded data must arrive at the receiving unit 100 of the moving image decoding apparatus in wrong order and at an incorrect timing.

In FIG. 1, when receiving inputted coded data having a data loss or error, the receiving unit 100 notifies information including information 106a about the data loss or error in the received coded data to the control unit 106, and, when determining that the coded data received by the receiving unit 100 be stored, the control unit 106 causes the receiving unit 100 to output them to the decoding unit 101, and also outputs a coded data delivery command 106b to the receiving unit 100 to cause it to deliver the coded data to the data storage unit 103. At this time, the control unit 106 judges whether or not the inputted coded data should be stored in the data storage unit by determining which frame type the coded data is classified. For example, when the inputted coded data is coded data about an I or P frame, the control unit 106 determines that the inputted coded data should be stored in the data storage unit. On the other hand, when the input coded data is coded data about a B frame, the control unit 106 determines that the inputted coded data should not be stored in the data storage unit. When determining that the inputted coded data should be stored in the data storage unit, the control unit 106 instructs the receiving unit 100 to deliver the whole coded data which constitutes the image frame to the data storage unit 103. After that, when coded data which constitutes another image frame has neither any data loss nor any errors, or when determining that coded data which constitutes another image frame should not be stored in the data storage unit even if the coded data has a data loss or error, the control unit 106 outputs it only to the decoding unit 101 in the usual manner.

After that, when the receiving unit 100 receives complementary coded data which is used for complementing an error in the coded data which is stored in the data storage unit 103, the control unit 106 causes the receiving unit 100 to output the complementary coded data only to the data storage unit 103.

The data storage unit 103 then rearranges a part of the coded data which has neither any data loss nor any errors, which is included in the coded data which has been delivered thereto, and the complementary coded data so that they are aligned in right order so as to newly form coded data, and outputs the newly-formed coded data to the redecoding unit 105 according to the output command 106e from the control unit 106. The redecoding unit 105 decodes the newly-formed coded data. Since the redecoding unit 105 needs to refer to one or more already-decoded image frames when decoding the newly-formed coded data, like the above-mentioned decoding unit 101, the redecoding unit 105 reads the one or more already-decoded image frames from the frame storage unit 102.

When referring to one or more already-decoded image frames so as to decode the image frame from the receiving unit 100, the decoding unit 101 can change the reference destination from which it will refer to the one or more already-decoded image frames so as not to refer the image frame having a data loss or error which has been held in the data storage unit, but to refer to the newly-redecoded image frame having little degradation in the image quality according to a command from the control unit 106. As a result, the quality of the decoded image can be improved. However, since the two buffers of the frame storage unit 102 have been occupied as shown in FIG. 2, the redecoding unit 105 writes the already-decoded image frame into the frame additionally-storage unit 104 according to a command from the control unit 106, and the decoding unit 101 refers to the frame additionally-storage unit 104 rather than the frame storage unit 102 according to a command from the control unit 106.

As will be mentioned later in detail, after starting referring to one or more already-decoded image frames in the frame additionally-storage unit 104, switching among the three buffers of the frame storage unit 102 and frame additionally-storage unit 104 is carried out according to a command from the control unit 106 so that the source from which decoded data is read and the destination into which decoded data is written are changed properly according to the empty situations of the three buffers. Therefore, the writing destination and reading source of the redecoding unit 105 are not fixed to the frame additionally-storage unit 104. Similarly, the writing destination and reading source of the decoding unit 101 are not fixed to the frame storage unit 102.

Figure 3:
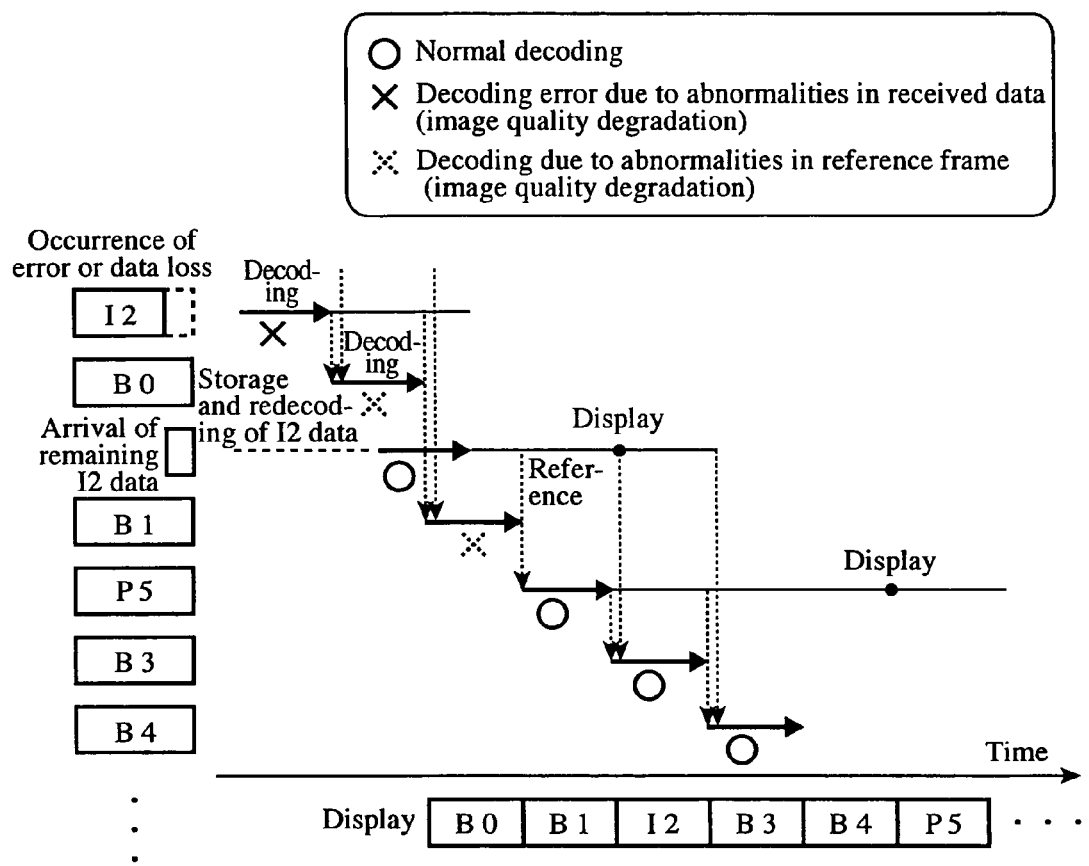
FIG. 3 is a diagram for explaining the decoding of image frames inputted to the moving image decoding apparatus in accordance with embodiment 1 of the present invention one by one, the timing at which coded data from which an error is removed reach a decoding unit in synchronization with the decoding of the image frames, and influence caused by the redecoding.

Next, the influence of timing at which the decoding unit 101 switches from the already-decoded image frame decoded by the decoding unit 101 to the already-decoded image frame redecoded by the redecoding unit 105 upon the quality of the decoded image will be explained. FIG. 3 is a diagram for explaining the decoding of image frames inputted to the moving image decoding apparatus one by one, the timing at which coded data from which an error or data loss is removed reach the redecoding unit in synchronization with the decoding of the image frames, and influence upon the redecoding of the coded data from which the error or data loss is removed. The vertical axis shows the coded data which arrive at the receiving unit 100 one by one, the horizontal axis shows the timings at which various processes are carried out by this moving image decoding apparatus for each image frame, and the timing at which the image frames are displayed is shown at the bottom of the figure.

In this example, a case where when receiving and decoding coded data which constitutes an I2 frame, the coded data having a data loss or error, and remaining complementary coded data that is used for complementing the I2 frame reaches the moving image decoding apparatus after the next B0 frame is inputted to the moving image decoding apparatus will be explained. In this case of FIG. 3, the decoding of each of frames including the first I2 frame having a data loss or error, and B0, B1, and P5 frames is performed by the decoding unit 101, the writing destination and reference destination of data to be referred is switched between the frame storage unit 102 and the frame additionally-storage unit 104 by the control unit 106. On the other hand, the coded data which constitutes the I2 frame having a data loss or error is also stored in the data storage unit 103. After that, the I2 frame is decoded again by the redecoding unit 105 at the time when the remaining complementary coded data that constitutes the I2 frame reaches the moving image decoding apparatus, and the decoded I2 frame is stored in a free area of either the frame storage unit 102 or the frame additionally-storage unit 104 according to a command from the control unit 106.

In this example of FIG. 3, an image which is obtained as the decoded result of the I2 frame containing a data loss or error which has reached the moving image decoding apparatus first suffers degradation in quality. When decoding each of the B0 and B1 frames, since only the I2 frame which still contains a data loss or error exists in either the frame storage unit 102 or the frame additionally-storage unit 104, the data loss or error in the I2 frame is handed down to an image which is obtained by decoding each of the B0 and B1 frames with reference to the decoded I2 frame (each arrow extending in a vertical direction in FIG. 3 shows a reference), and this causes degradation in the quality of the image. This degradation is not dependent on the presence or absence of an error in the coded data of each of the B0 and B1 frames. However, before the decoding of the P5 frame and subsequent image frames is started, the redecoding of the I2 frame is completed, and the decoded data about the I2 frame exists in either the frame storage unit 102 or the frame additionally-storage unit 104. Therefore, the P5 frame and subsequent image frames can be decoded with reference to the redecoded data about the I2 frame without being under the influence of the loss or error in the original I2 frame.

In this example of FIG. 3, since the decoding of coded data about each image frame takes one frame time, if the remaining complementary coded data about the I2 frame can be received and the redecoding of the I2 frame can be started by the time when a time interval of two frame times long elapses since the decoding of the coded data about the original I2 frame is started (i.e., by the time when the decoding of the B1 frame is started), the redecoded I2 frame can be used as the reference frame at the time of the decoding of the P5 frame. Therefore, the data loss or error in the decoded I2 frame is not handed down to the decoding of the subsequent image frames.

Conversely, if the remaining complementary coded data about the I2 frame cannot be received and the redecoding of the I2 frame cannot be started by the time when a time interval of two frame times long elapses since the decoding of the coded data about the original I2 frame is started, since the P5 frame and subsequence image frames are decoded with reference to the I2 frame having a data loss or error, the decoded results of the P5 frame and subsequence image frames suffer degradation even if there is no error in the received data about each of them. This adverse effect continues until the next I frame is received.

Next, how the control unit 106 determines, as the reading source and writing destination of each decoded image frame obtained by each of the decoding unit 101 and redecoding unit 105, either of the frame storage unit 102 and frame additionally-storage unit 104 will be explained.

Figure 4:
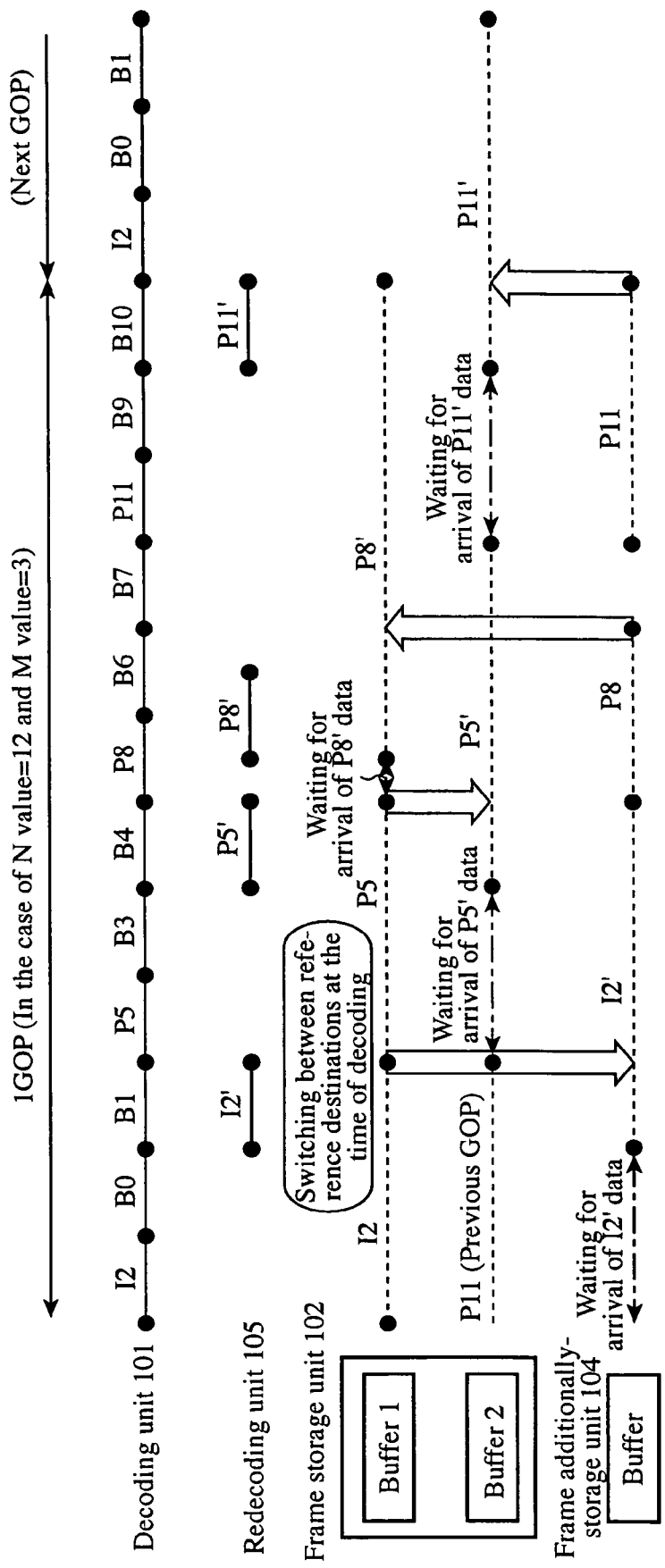
FIG. 4 is a diagram showing the operation timing of each of the decoding unit and a redecoding unit of the moving image decoding apparatus in accordance with this embodiment 1, and also showing data stored in a frame storage unit and data stored in a frame additionally-storage unit.

FIG. 4 is a diagram showing the operation timing of each of the decoding unit 101 and redecoding unit 105 of the moving image decoding apparatus in accordance with this embodiment 1, and also showing data stored in the frame storage unit 102 and data stored in the frame additionally-storage unit 104.

FIG. 4 shows image frames which are inputted to the decoding unit 101 and are then decoded by the decoding unit 101 when the decoding time comes regardless of whether the I2 frame includes an error or loss, and an I2' frame of complementary coded data which is used to complement coded data which constitutes the I2 frame reaches the moving image decoding apparatus after a delay, and which is then stored in and is reconstructed by the data storage unit 103, and is decoded by the redecoding unit 105. Since the I2' frame has a fewer loss and a fewer error than the I2 frame, as yet-to-be-decoded coded data, the quality of the decoded image of the I2' frame is better than that of the decoded image of the I2 frame.

In the example of FIG. 4, assume that the I and P frames are handled as frames to be stored and the redecoding of each of the I and P frames is put on standby until it is referred to at the time of the decoding of a subsequent P or B frame.

In the example of FIG. 4, when the receiving unit receives the complementary coded data which constitutes the I2' frame and all needed coded data are stored in the data storage unit 103 immediately before the decoding of the B1 frame is performed, the redecoding unit 105 decodes the I2' frame. At that time, since the two buffers of the frame storage unit 102 are occupied, the buffer of the frame additionally-storage unit 104 is used for storing data currently being decoded or decoded data. Since the I2' frame exists in neither the frame storage unit 102 nor the frame additionally-storage unit 104 or the I2' frame is being decoded at the time of the decoding of each of the B0 and B1 frames, the control unit 106 instructs the decoding unit 101 to refer to the I2 and P11 (in the previous GOP) frames stored in the frame storage unit 102 so as to decode each of the B0 and B1 frames. After the decoding of the I2' frame is completed, the control unit 106 instructs the decoding unit 101 to switch the reference destination at the time of the decoding of the P5 frame from the I2 frame stored in the buffer 1 of the frame storage unit 102 to the I2' frame stored in the buffer of the frame additionally-storage unit 104. Also at the time of the decoding of each of the B3 and B4 frames, the control unit 106 instructs the decoding unit 101 to refer to, as the I and P reference frames, the I2' frame stored in the frame additionally-storage unit 104 and the P5 frame stored in the buffer 1 of the storage unit 102.

Therefore, since the I2 frame is never referred to for the decoding of any frame and becomes unnecessary after the decoding of the I2' frame has been completed, the I2 frame stored in the buffer 1 of the frame storage unit 102 is erased, and therefore the buffer 1 of the frame storage unit 102 is released. Immediately after that, the buffer 1 of the frame storage unit 102 is used for the decoding of the P5 frame by the decoding unit 101. The display timing of the I2 frame comes immediately after the P5 frame is decoded. Also at this time, the I2' frame is read from the buffer of the frame additionally-storage unit 104 and is outputted to a display unit located at the next stage.

According to the same procedure as previously shown, the P5 frame stored in the buffer 1 of the frame storage unit 102 is erased, and therefore the buffer 1 of the frame storage unit 102 is released when the decoding of the P5' frame is completed by the redecoding unit 105. After that, the P5' frame stored in the buffer 2 of the frame storage unit 102 is referred to at the time of the decoding of each frame (P8, B6, or B7) which is scheduled to refer to the P5 frame.

It is also noted that the I2' frame is referred to not only at the decoding of the B4 frame by the decoding unit 101 but at the redecoding of the P5' frame by the redecoding unit 105.

The timing of the start of the redecoding of each of the I and P frames is not necessarily synchronized with the timing of the start of the decoding of each image frame by the decoding unit 101. In the case of the example shown in FIG. 4, within a time period which does not exceed one frame time immediately after the decoding of the P8 frame is started, coded data which can improve the data loss or error in the P8 frame is received and the redecoding of the P8' frame is then started. At this time, this P8' frame can be referred to not only at the time of the decoding of each of the P11, B9, and B10 frames but alto at the time of the decoding of the B7 frame.

Although the redecoding of the P8' frame is completed during the decoding of the B6 frame, the control unit can change the reference frame from the P8 frame to the P8' frame immediately during the decoding of the B6 frame if it can switch between the reference source, or can change the reference frame after waiting for the completion of the decoding of the B6 frame, as shown in FIG. 4, according to the structure of the decoding unit 101.

As previously mentioned, since the frame additionally-storage unit 104 is additionally disposed in the moving image decoding apparatus, and the control unit 106 is so constructed as to instruct each of the decoding unit 101 and redecoding unit 105 to switch the reading source and writing destination of each decoded image frame obtained thereby between the frame storage unit 102 and the frame additionally-storage unit 104, the image to be referred to can be replaced by a redecoded image.

In this embodiment 1, the inter-frame-prediction coding method which complies with the MPEG 2 Video standard is taken as an example of the coding method for use in this embodiment, and both the I frames and the P frames are defined as a target which is to be stored temporarily and is to be redecoded. As an alternative, only the I frames or either of the I frames and the P frames can be defined as a target which is to be stored temporarily and is to be redecoded. Another coding method which complies with another standard, such as MPEG4 or H.264, can be used as the coding method of this embodiment. Furthermore, when a coding method newly comes out in the future, the decoding method in accordance with this embodiment can be applied to any image which is coded using the new coding method as long as some image frames are referred to at the time of the decoding of subsequent image frames after decoded, or it takes a certain time to display input image frames.

In addition, in this embodiment 1, the inter-frame-prediction coding method of referring to at most two frames at the time of the decoding of each image frame is taken as an example. This embodiment can be also applied to a case where at most three or more of frames are referred to at the time of the decoding of a type of image frame as long as a certain number of frames which makes it possible for the decoding unit to carry out the decoding normally can be stored in the frame storage unit 102.

On the other hand, since each B frame is not referred to at the time of the decoding of another image frame, any improvement in the image quality of each B frame does not affect the quality of any subsequent image frame, and each B frame cannot be a target to be redecoded since any buffering for the reference of each B frame is unnecessary. The same goes for another coding method such as MPEG4 or H.264.

In this embodiment 1, although the decoding unit 101 and redecoding unit 105 are provided as the decoding means, as previously mentioned, it is not necessary to provide the two decoding units physically if two frames can be decoded within a normal time period during which each frame is decoded, as mentioned above. For example, only one decoding unit which can decode a frame at twice the normal speed can be disposed, and can be time-shared between two frames.

Unlike the cases shown in FIGS. 3 and 4, a case where the decoding time is not equal to one frame time and a case where the timing at which the reference of other frames is carried out is not only the timing at which the first decoding is carried out can adopt this method. However, it is needless to say that the time required to store a frame in the data storage unit 103 for prevention of propagation of an error to the decoding of subsequent frames due to the redecoding of an I or P frame differs.

Figure 5:
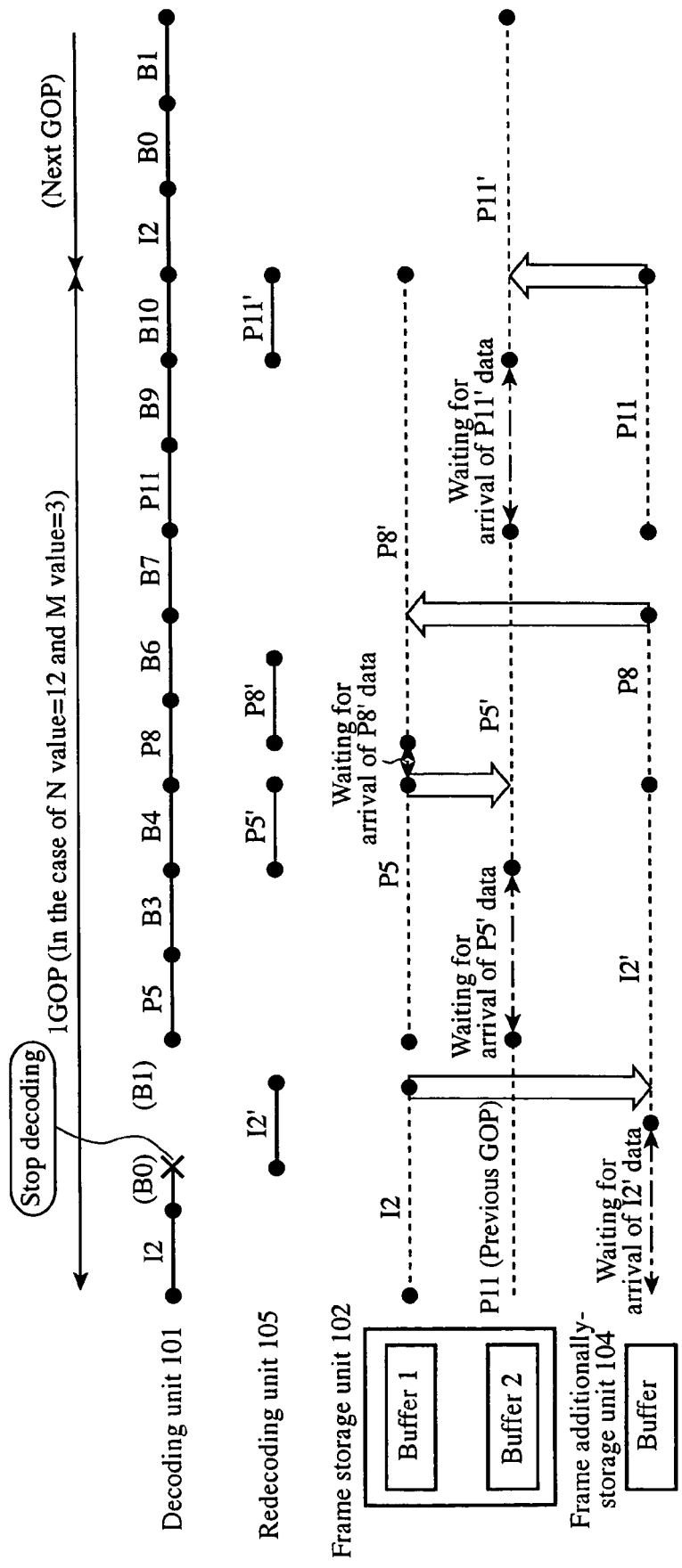
FIG. 5 is a diagram explaining a case where the general decoding is stopped when it becomes clear that a reference image will be improved later in the moving image decoding apparatus in accordance with this embodiment 1.

FIG. 5 is a diagram explaining a case where the normal decoding is stopped when it becomes clear that the reference image will be improved later in this embodiment 1.

In this example of FIG. 5, while the B0 frame is decoded, correct coded data which constitutes the I2 frame reaches the moving image decoding apparatus after a delay, and the I2' frame is redecoded. At this time, the redecoding of the I2' frame is completed and only the decoding of each of the P5 frame and subsequent frames can refer to this redecoded I2' frame as the reference image. Therefore, although the I2 frame which is decoded first is referred to at the time of the decoding of each of the B0 and B1 frames, the decoding and display (i.e. the output to the display unit located at a later stage) of each of the B0 and B1 frames can be stopped since it turns out that the image quality of each of the P frame and image frames following the P5 frame will be improved.

As previously explained, the time which elapses until the redecoding of an I or P frame is started since the normal decoding of the frame has been started, i.e., the storage time during which the decoded result of the frame is stored in the data storage unit 103 is equal to or less than two frame times long, the redecoded image frame can be referred to at the time of the decoding of subsequent image frames. As an alternative, the redecoded image frame can be stored in the data storage unit 103 during a fixed time period other than the above-mentioned time which elapses until the redecoding of the I or P frame is started since the normal decoding of the frame has been started, and the redecoding can be put on standby.

Furthermore, there can be a case where the timing at which the decoding of coded data is started by the decoding unit 101 is not managed with time, but the next decoding is started at the timing at which the decoding of a previous image frame is completed. In such a case, what is necessary is just to consider the progressing state of the decoding of each image frame by the decoding unit 101 and the time required for the redecoding of each I or P frame, and to store the decoded result of each image frame in the data storage unit 103 so that each redecoded image frame can be in time for the reference of each redecoded image frame at the time of the decoding of subsequent image frames.

In this embodiment, when coded data in which any data loss and any error are removed is all received after a delay, the storage of the coded data is ended and the coded data is redecoded, as previously mentioned. As an alternative, a certain threshold about the improvement factor of an error which coded data has can be provided, and the redecoding of the coded data can be carried out according to the improvement factor, or the redecoding of the coded data can be started even if the error is not removed completely after the expiration of a predetermined time interval since the coded data has been received. When the improvement factor of the error is low at the time when the redecoding of the coded data is started and the improvement of the quality of the decoded image cannot be expected, the moving image decoding apparatus can discard the coded data without redecoding it.

As mentioned above, in accordance with this embodiment 1, when the receiving unit 100 receives an image frame which consist of coded data having a data loss or error, the control unit 106 determines whether or not the image frame should be stored according to the type of the image frame, when the control unit 106 determines that the image frame should be stored, the data storage unit 103 stores the coded data having a data loss or error and complementary coded data which is used to complement the data loss or error of the coded data according to a command from the control unit 106, and rearranges the coded data and complementary coded data so that they are aligned in right order to newly construct correct coded data, the redecoding unit 105 decodes the newly-constructed correct coded data and stores it, as a frame to be referred to, in either the frame storage unit 102 or the frame additionally-storage unit 104 according to a command from the control unit 106, and the decoding unit 101 decodes subsequent image frames with reference to the frame to be referred to which has been decoded by the redecoding unit 105 and which is stored in either the frame storage unit 102 or the frame additionally-storage unit 104 according to a command from the control unit 106. Therefore, the present embodiment offers an advantage of being able to improve the quality of a decoded image frame to be referred to in which a loss or an error has occurred, and which is to be referred to at the time of the decoding of another image frame, and to improve the quality of image frames which are decoded with reference to the image frame to be referred to.

In addition, in accordance with this embodiment 1, since the moving image decoding apparatus carries out the reception and redecoding of complementary coded data which reaches the moving image decoding apparatus after a delay during a buffering time period at the time of the decoding of an image frame, which has been conventionally provided, the present embodiment offers an advantage of being able to reduce the degradation in the quality of the decoded image without changing a delay time from the reception of each image frame to the display of each image frame.

Furthermore, this embodiment makes it clear that whether or not the propagation of errors can be prevented depends upon by when the redecoding of each I or P frame will be completed with the structure of reference frames and frames to be referred to, i.e., the frame structure of GOP. Therefore, the present embodiment offers another advantage of being able to set up the storage time during which coded data is stored exactly.

In addition, in accordance with this embodiment 1, since coded data which is the target for storage and redecoding is only coded data which constitutes an image frame to be referred to, this embodiment 1 offers a further advantage of being able to reduce the capacity of the data storage unit 103 and processing by the redecoding unit 105.

Furthermore, in accordance with this embodiment 1, when the inputted moving image is an MPEG 2 or MPEG4 moving image, the I frames and the P frames are the target for storage and redecoding. According to the above-mentioned method of this embodiment, moving image data which come into widespread use and are put into circulation in the form of a DVD (Digital Video Disc), or through digital broadcasting or moving image delivery to mobile terminals can be transmitted and received. In this case, this embodiment 1 offers an advantage of being able to reduce the degradation in the image quality of the decoded moving image.

In addition, in accordance with this embodiment 1, when it turns out that since a redecoded image frame is referred to at the time of the decoding of subsequent image frames, the quality of the decoded image being played back will be improved, the moving image decoding apparatus does not decode and display image frames starting from the image frame currently being decoded and ending at an image frame which is to be decoded immediately before an image frame which is to be decoded with reference to the above-mentioned redecoded image frame. Therefore, the present embodiment offers another advantage of being able to reduce unnecessary display of decoded images which degrade in quality, and to reduce the computation load caused by the decoding of each image frame.

Furthermore, since it is possible to delay the start timing of the redecoding of each I or P frame if a resultant computation resource can be allocated to the redecoding and the redecoding processing can be carried out at a higher speed, the allowable upper limit of the delay time after which the coded data which is the target for redecoding reaches the moving image decoding apparatus can be increased.

In addition, the moving image decoding apparatus in accordance with this embodiment 1 aims to improve the quality of the decoded image in consideration of a data loss or error which occurs in the image frames being transmitted via the network, and a change in their places. Therefore, since the moving image decoding apparatus in accordance with this embodiment 1 can carry out transmission control of the transmit side or the network by imposing looser restrictions than before on the transmission control in consideration of that the moving image decoding apparatus has higher resistance to fluctuations in the delay which occurs in the network compared with related art moving image decoding apparatus, the load on them can be reduced.

Furthermore, the present embodiment offers a further advantage of being able to make it possible to give a higher priority to the allocation of resources to the moving image decoding apparatus than to other apparatus connected to the same network which have lower resistance to the delay.

Embodiment 2

In above-mentioned embodiment 1, the data storage time and decoding time of the data storage unit 103 are fixed. In contrast, in accordance with this embodiment 2, the opportunity to receive and redecode correct coded data is increased by changing the storage time during which coded data is stored in the data storage unit 103 according to the structure of reference frames and frames to be referred to, i.e., the frame structure of GOP, and the decoding time of the decoding unit 101, as will be explained below.

Figure 6:
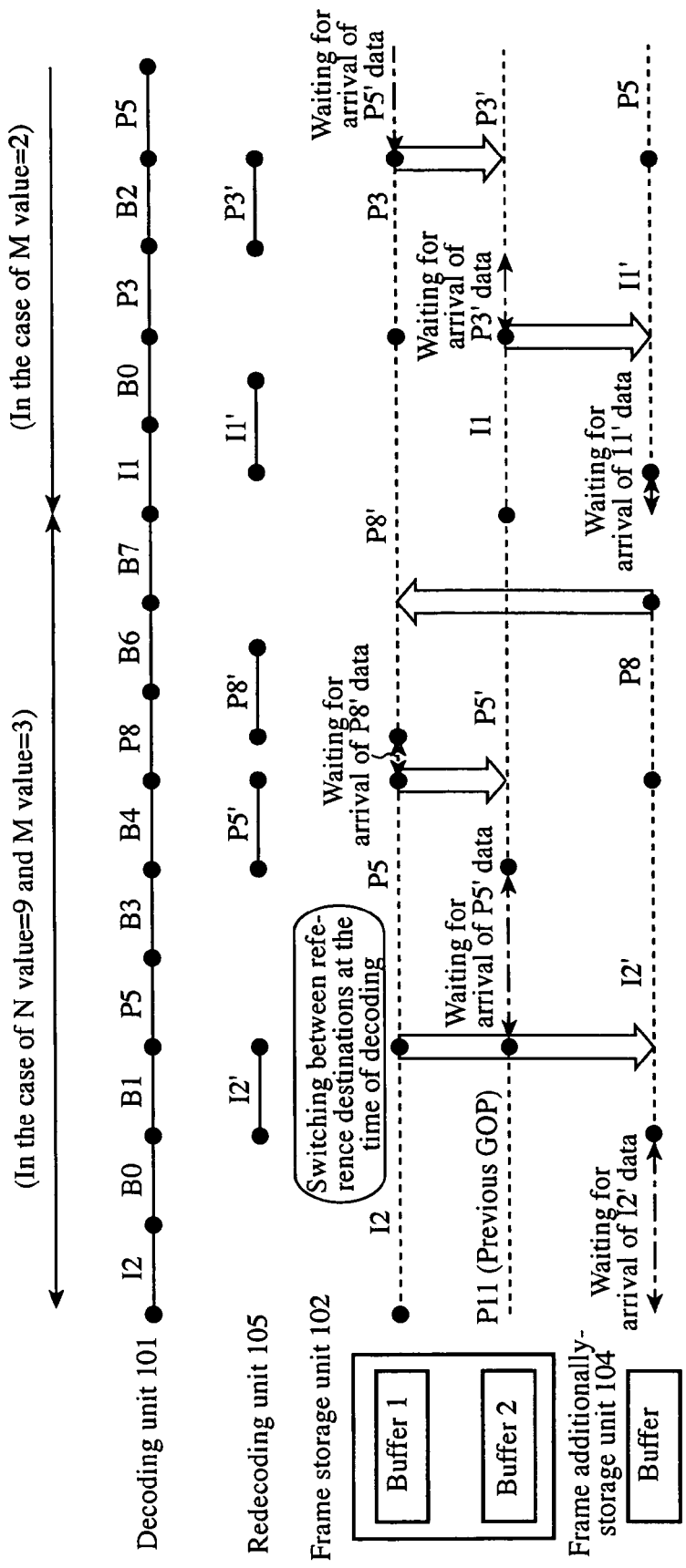
FIG. 6 is a diagram showing the operation timing of each of a decoding unit and a redecoding unit of a moving image decoding apparatus in accordance with this embodiment 2, and also showing data stored in a frame storage unit and data stored in a frame additionally-storage unit.

FIG. 6 is a diagram showing the operation timing of the decoding unit 101 and that of the redecoding unit 105, and data stored in the frame storage unit 102 and data stored in the frame additionally-storage unit 104, like FIG. 4 of above-mentioned embodiment 1. The structure of reference frames and frames to be referred in GOP differs from that shown in FIG. 4 of above-mentioned embodiment 1 in that the M value of GOP changes from 3 to 2 on the way.

Figure 7:
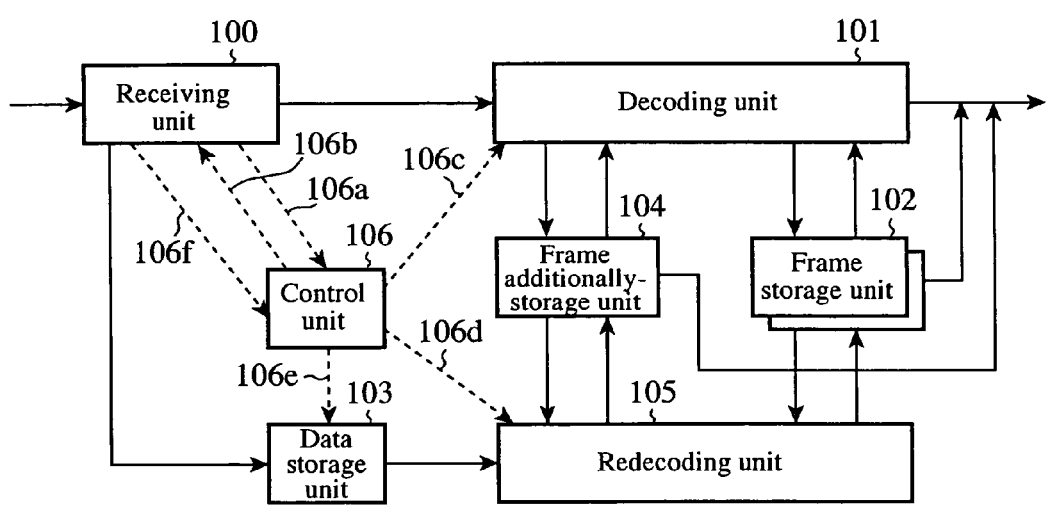
FIG. 7 is a block diagram showing the structure of a moving image decoding apparatus in accordance with embodiment 2 of the present invention.

FIG. 7 is a block diagram showing the structure of a moving image decoding apparatus in accordance with embodiment 2 of the present invention, in which a decoding method of changing the storage time during which coded data is stored in the data storage unit 103 according to a change in the structure of reference frames and frames to be referred to in GOP is implemented. The moving image decoding apparatus in accordance with embodiment 2 differs from that of above-mentioned embodiment 1 shown in FIG. 1 in that a signal line for data structure information 106ƒ which is extending from the receiving unit 100 to the control unit 106 is added, and the other structure of the moving image decoding apparatus in accordance with embodiment 2 is the same as that of the moving image decoding apparatus in accordance with embodiment 1 shown in FIG. 1.

In FIG. 7, the receiving unit 100 analyzes the frame structure of a plurality of types of image frames, and notifies data structure information about the frame structure to the control unit 106, and the control unit 106 controls the storage time during which an image frame is stored in the data storage unit 103 on the basis of the data structure information notified thereto from the receiving unit 100.

Next, the operation of the moving image decoding apparatus in accordance with this embodiment of the present invention will be explained.

In the example of FIG. 6, received coded data is data in the form of MPEG2 VIDEO, and the first GOP has an M value of 3, that is, two B frames which are image frames which the decoding unit decodes by referring to I and P frames to be referred to are inserted between these I and P frames. On the other hand, the next GOP has an M value of 2. In the case of the first GOP, when decoding a P frame which can be a reference frame or frame to be referred to, in order to complete the redecoding of the I frame by the time when the decoding unit refers to another image frame, what is necessary is just to delay the timing at which the redecoding of the I frame is carried out by a time interval of two frame times long with respect to the normal decoding start timing when the time required for the decoding is one frame time.

For example, in FIG. 6, the P5 frame is the frame which the decoding unit decodes by referring to the I2 frame, and is also referred to when the decoding unit decodes subsequent image frames. Therefore, if the quality of the decoded I2 frame image can be improved by the time when the decoding unit refers to the I2 frame at the time of the decoding of the P5 frame, the degradation in the image quality can be prevented from propagating to subsequent frame images. Taking that the decoding time is equal to one frame time into consideration, if correct coded data which constitutes the I2 frame can be received by the time when a time interval of two frame times long elapse since the decoding of the I2 frame has been started, the decoding of the I2' frame can be completed by the time when the decoding unit refers to the decoded I2 frame at the time of the decoding of the P5 frame.

On the other hand, in the next GOP, since the M value is 2, in order to complete the redecoding of, for example, the P3' frame which is the result of decoding the P3 frame by the time when the decoding unit starts decoding the P5 frame by referring to the P3 frame, what is necessary is just to delay the redecoding start timing by at most one frame time with respect to the timing of the decoding of the P3 frame.

Thus, the moving image decoding apparatus can control the timing at which it starts the redecoding of each of the I frames and the P frames so that the redecoding is in time for the timing at which it has to refer to another frame image by changing the storage time during which coded data is stored in the data storage unit 103 according to the frame structure of GOP. The structure shown in FIG. 7 implements this method. In this structure, since the receiving unit 100 analyzes the frame structure of GOP to examine the structure of reference frames and frames to be referred to, and notifies this structure, as data structure information 106ƒ, to the control unit 106, the control unit 106 can control by when the receiving unit 100 can deliver coded data about each frame to be referred to which has reached the moving image decoding apparatus after a delay to the data storage unit 103, and by when the data storage unit 103 can store the coded data to send the data to the redecoding unit 105.

For example, when using, as the coding method, the MPEG2 VIDEO coding, the receiving unit 100 can examine the structure of reference frames and frames to be referred to of the coded data by using a method of checking a TEMPORAL_REFERENCE value added to the picture header of each image frame. This value corresponds to the display turn of each image frame in GOP, such as "2" in the I2 frame or "0" in the B0 frame shown in FIG. 6. That is, that the TEMPO- RAL_REFERENCE value added to the first coded data in GOP is 2 means that two B frames follow the first coded data, and that the TEMPORAL_REFERENCE value added to the first coded data in GOP is 1 means that one B frame follows the first coded data.

However, in a case where there is no GOP before the GOP currently being processed, such as a case where the GOP currently being processed is the leading GOP of a coded stream, a P frame can come immediately after the I frame.

Furthermore, when information corresponding to the M value is shown directly or indirectly in each coded data, for example, the control unit can determine the structure of reference frames and frames to be referred to according to the information corresponding to the M value. For example, by independently storing the information in a user data area inside or outside each coded data so as to transmit the information to the moving image decoding apparatus, the control unit can extract the information from each coded data to determine the structure of reference frames and frames to be referred to.

In the above description, the time required for the decoding is fixed to be one frame time. In contrast, when the time required for the decoding is changed, the storage time during which coded data is stored in the data storage unit 103 can be determined using the decoding time of the decoding unit 101 when the redecoding of each I or P frame image from which any error and any data loss are removed is carried out.

Figure 8:
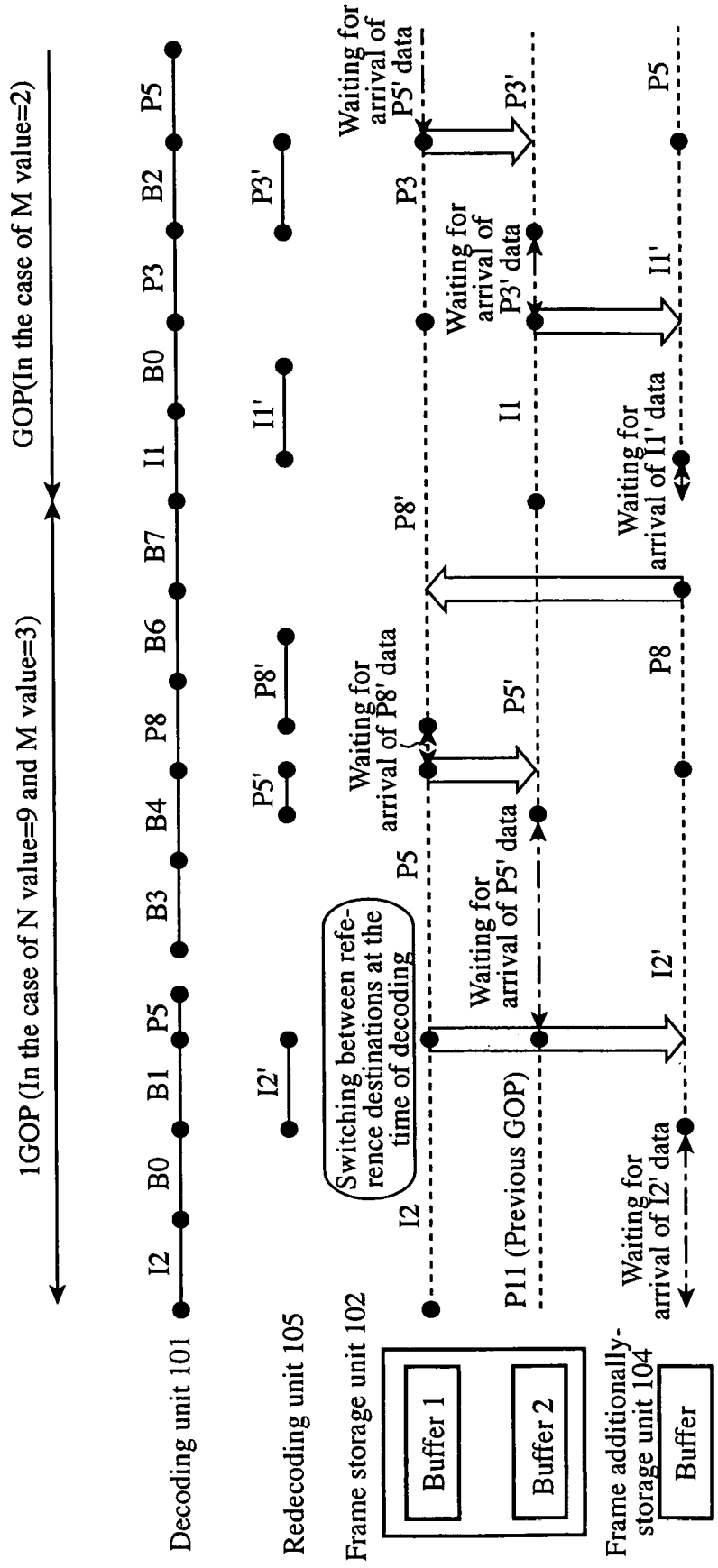
FIG. 8 is a diagram showing the operation timing of each of a decoding unit and a redecoding unit of a moving image decoding apparatus in accordance with this embodiment 2, and also showing data stored in a frame storage unit and data stored in a frame additionally-storage unit.

FIG. 8 is a diagram showing the operation timing of the decoding unit 101 and that of the redecoding unit 105, and data stored in the frame storage unit 102 and data stored in the frame additionally-storage unit 104, like FIG. 6. FIG. 8 differs from FIG. 6 in that the decoding time required for the decoding unit 101 to decode the P5 frame and the decoding time required for the redecoding unit 105 to decode the P5' frame are all equal to 0.5 frame times long.

Figure 9:
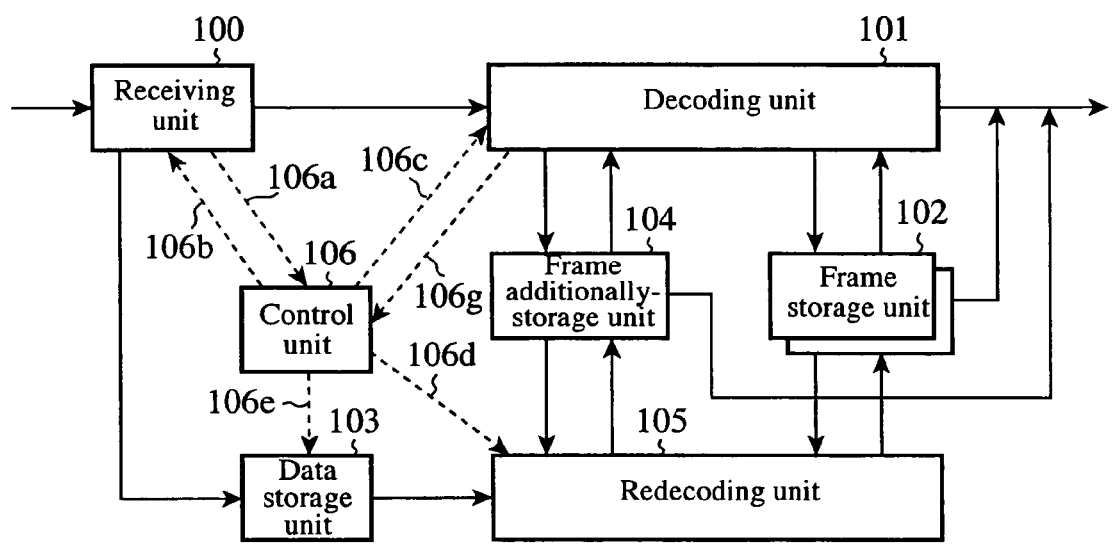
FIG. 9 is a block diagram showing a moving image decoding apparatus in accordance with a variant of embodiment 2 of the present invention.

FIG. 9 is a block diagram showing the structure of a moving image decoding apparatus in accordance with a variant of embodiment 2 of the present invention. This moving image decoding apparatus implements a method of determining the storage time during which coded data is stored in the data storage unit 103 using the decoding time of the decoding unit 101 when carrying out the redecoding of each I or P frame image from which any error and any data loss are removed. The moving image decoding apparatus of this variant differs from that of above-mentioned embodiment 1 shown in FIG. 1 in that a signal line extending from the decoding unit 101 to the control unit 106, via which information indicating the decoding time required for the decoding unit to decode each frame image is transmitted, is added, and the other structure of the moving image decoding apparatus of this variant is the same as that of the moving image decoding apparatus shown in FIG. 1.

In FIG. 9, the decoding unit 101 notifies the decoding time required to decode each image frame to the control unit 106, and the control unit 106 controls the storage time during which each image frame is stored in the data storage unit 103 on the basis of the decoding time notified thereto from the decoding unit 101.

FIG. 8 shows a case where the decoding of the P5 frame takes a time interval of 0.5 frame times long. In this case, in order to make the decoding of the P5' frame be in time for the reference of the P5 frame at the time of the decoding of the P8 frame, the storage time during which coded data is stored in the data storage unit 103 since the decoding of the P5 frame has been started has to be set to be equal to a time interval of 2.5 frame times long rather than 2 frame times long.

Then, as shown in FIG. 9, the decoding unit 101 notifies the information 106g indicating the decoding time required to decode each image frame to the control unit 106 after completing the decoding of each image frame, and the control unit 106 then determines the storage time during which coded data is stored in the data storage unit 103 according the information 106g indicating the decoding time required to decode each image frame.

As mentioned above, in accordance with this embodiment 2, since the receiving unit 100 analyzes the frame structure of a plurality of types of image frames inputted thereto, and notifies data structure information about the frame structure to the control unit 106, and the control unit 106 controls the storage time during which each image frame is stored in the data storage unit 103 on the basis of the data structure information notified thereto from the receiving unit 100, the moving image decoding apparatus can store coded data in the data storage unit 103 for a maximum long time which falls within a range which suppresses the propagation of degradation in the image quality to subsequent decoded image frames. Therefore, this embodiment offers an advantage of being able to increase the opportunity to receive and redecode correct coded data.

Furthermore, in accordance with this embodiment 2, since the decoding unit 101 notifies the decoding time required to decode each image frame to the control unit 106, and the control unit 106 controls the storage time during which each image frame is stored in the data storage unit 103 on the basis of the decoding time notified thereto from the decoding unit 101, the moving image decoding apparatus can store the coded data about each image frame in the data storage unit 103 for a maximum long time according to the decoding time required to decode each image frame. Therefore, this embodiment offers an advantage of being able to increase the opportunity to receive and redecode correct coded data.

Embodiment 3

In this embodiment 3, a case where a buffer area for storing one more image frame is additionally disposed, and therefore the number of image frames in each of which the propagation of degradation in the image quality is suppressed is increased will be explained.

Figure 10:
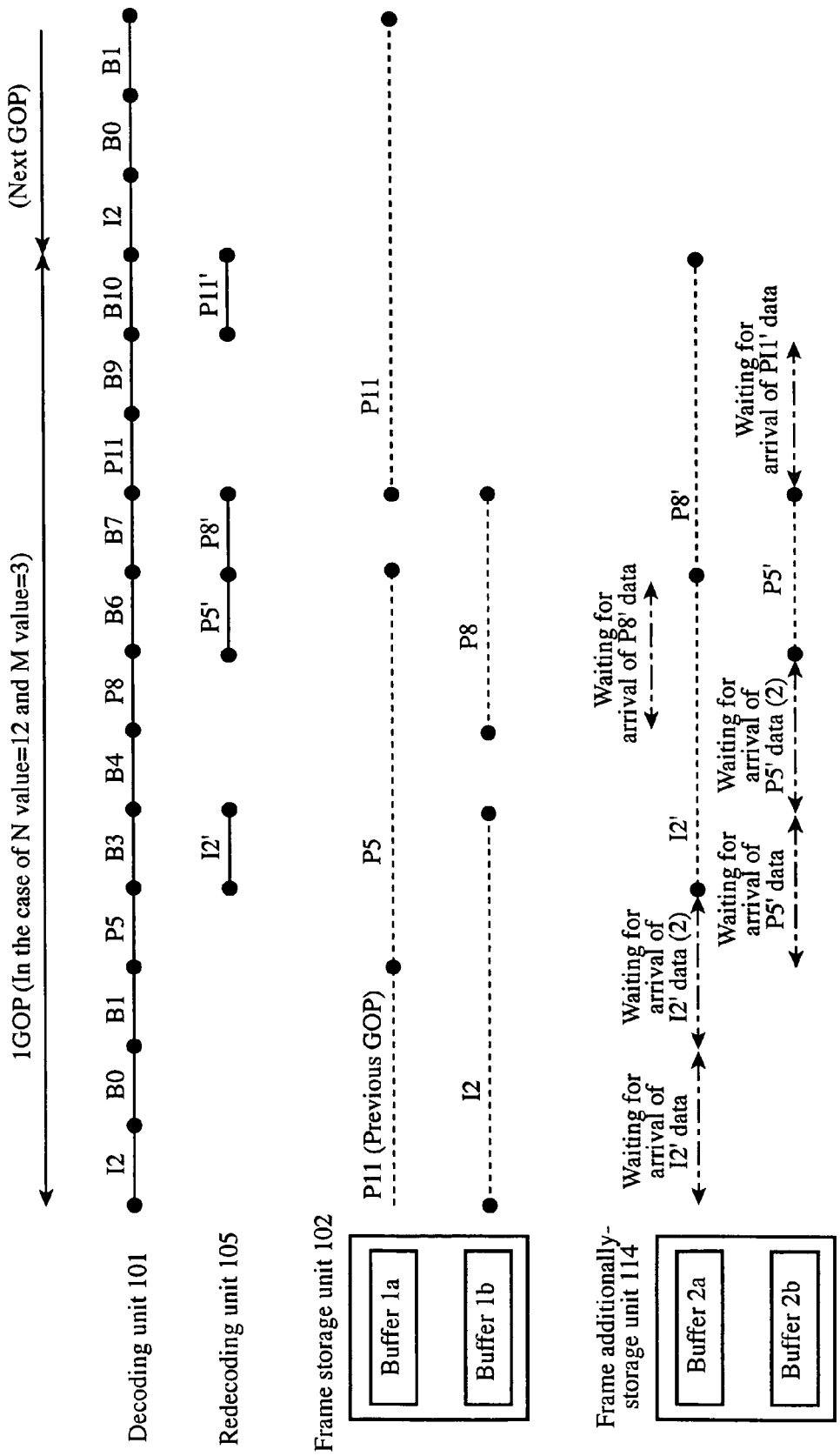
FIG. 10 is a diagram showing the operation timing of each of a decoding unit and a redecoding unit of a moving image decoding apparatus in accordance with this embodiment 2, and also showing data stored in a frame storage unit and data stored in a frame additionally-storage unit.

FIG. 10 is a diagram showing the operation timing of the decoding unit 101 and that of the redecoding unit 105, and data stored in the frame storage unit 102 and data stored in a frame additionally-storage unit 114, like FIG. 4. FIG. 10 differs from FIG. 4 in that the frame additionally-storage unit 114 has two buffers (i.e., buffers 2a and 2b).

Figure 11:
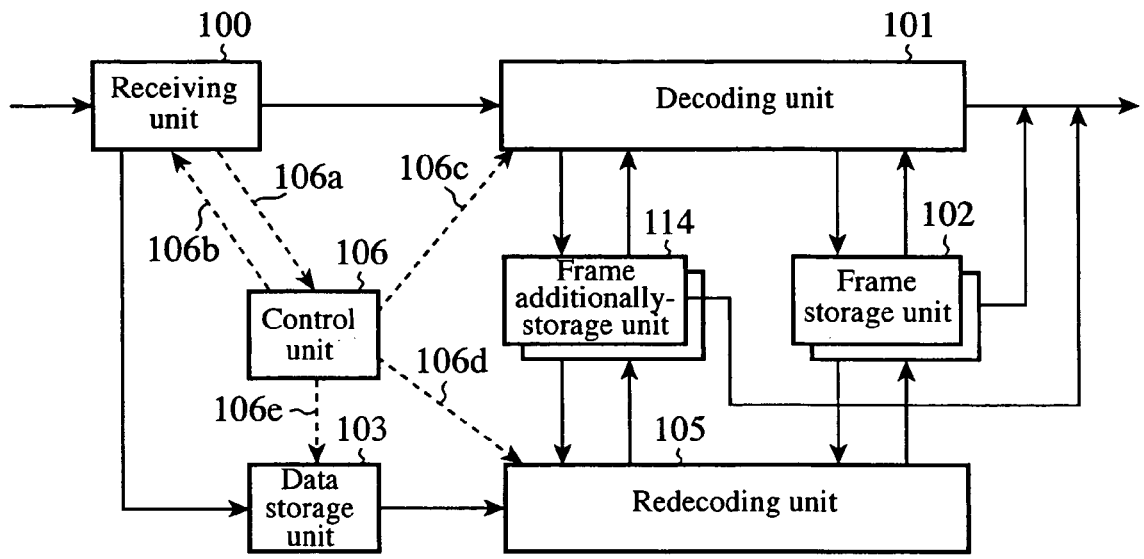
FIG. 11 is a block diagram showing the structure of a moving image decoding apparatus in accordance with embodiment 3 of the present invention.

FIG. 11 is a block diagram showing the structure of a moving image decoding apparatus in accordance with embodiment 3 of the present invention, and the moving image decoding apparatus in accordance with embodiment 3 differs from that of above-mentioned embodiment 1 in that it has the frame additionally-storage unit 114 instead of the frame additionally-storage unit 104 of above-mentioned embodiment 1 shown in FIG. 1, the number of buffers included in the frame additionally-storage unit 114 is larger than the number of buffers included in the frame additionally-storage unit 104 of above-mentioned embodiment 1 by 1 and the other structure of the moving image decoding apparatus in accordance with this embodiment 3 is the same as that of the moving image decoding apparatus in accordance with embodiment 1 shown in FIG. 1. That is, in FIG. 11, the frame additionally-storage unit 114 stores at least two decoded image frames.

Next, the operation of the moving image decoding apparatus in accordance with this embodiment of the present invention will be explained.

In the example of FIG. 10, the redecoding of each I or P frame from which any error and any data loss are removed can be completed by the time when the decoding of another image frame which is to be carried out with reference to the redecoded result by waiting for the arrival of complementary coded data which complements the I or P frame after a delay for a time period of two frame times long, as in the case of above-mentioned embodiment 1. In addition, when further waiting for the arrival of the coded data after a delay until a further time period of two frame times long will elapse is permitted, the redecoding of the I or P frame cannot be completed in time for the decoding of the above-mentioned other image frame, but can be completed in time for the decoding of subsequent other image frames.

To be more specific, unless starting the redecoding of the I2' frame within a time period of two frame times long since the decoding unit starts the decoding of the I2 frame, the redecoding unit cannot make the redecoded result of the I2' frame be in time for the reference of the I2 frame at the time of the decoding of the P5 frame by the decoding unit. Therefore, although the degradation in the image quality propagates to subsequent frame images including an image which the decoding unit will decode with reference to the P5 frame, since the redecoding unit can make the redecoded result of the I2' frame be in time for the reference of the I2 frame at the time of the decoding of the B3 frame if the redecoding unit starts the redecoding of the I2' frame within a time period of three frame times long since the decoding of the I2 frame has been started, the propagation of the image quality degradation to the B3 and B4 frames can be suppressed. On the other hand, as shown in FIG. 10, if the redecoding unit starts the redecoding of the I2' frame within a time period of four frame times long since the decoding of the I2 frame has been started, the propagation of the image quality degradation to only the B4 frame can be suppressed.

However, since the storage time during which the I2 frame is stored in the frame storage unit 102 is lengthened, as shown in FIG. 10, and overlaps both the frame storage time period during which the P5 frame currently being decoded is stored after the decoding of the P5 frame is started, and the frame storage time period during which the decoded P5 frame is stored, one more buffer is needed.

To this end, as shown in FIG. 11, a further buffer needs to be additionally disposed in the frame additionally-storage unit 114, and the control unit 106 needs to refer to frame images as shown in FIG. 10 and to instruct the decoding unit 101 and redecoding unit 105 to select, as a source or destination from or to which each of them reads or writes an image frame, either the frame storage unit 102 or the frame additionally-storage unit 114.

As mentioned above, in accordance with this embodiment 3, since the number of frames which can be stored at the time of the redecoding of an I or P frame from which a data loss or error is removed is increased, and the time period during which the redecoding can be carried out is lengthened, the redecoding unit is allowed to wait for complementary coded data which reaches the moving image decoding apparatus after a delay for a longer time by using a means for receiving the complementary coded data retransmitted thereto from the transmission line, all needed coded data having a little loss and a small error are acquired at the normal timing, and therefore the quality of decoded image frames which the decoding unit obtains with reference to redecoded image frames can be improved.

Embodiment 4

In this embodiment 4, a moving image decoding apparatus which uses a part of the functions which implement related art moving image decoding apparatus will be explained.

Figure 12:
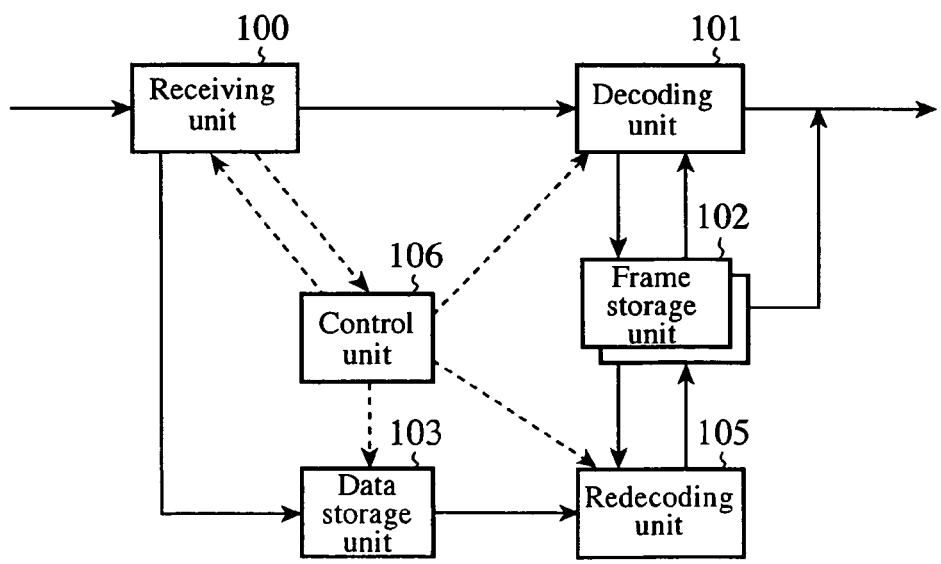
FIG. 12 is a block diagram showing the structure of a moving image decoding apparatus in accordance with embodiment 4 of the present invention.

FIG. 12 is a block diagram showing the structure of the moving image decoding apparatus in accordance with embodiment 4 of the present invention, which decodes coded data about a moving image with a high resolution and coded data about a moving image with a standard resolution. A moving image with a high resolution is a moving image which is intended to be displayed on a screen with a higher resolution compared with pixel sizes for use in standard TV broadcasting, for example, a moving image which complies with HDTV (High Definition TeleVision) for analog Hi-Vision or digital TV broadcasting.

The moving image decoding apparatus shown in FIG. 12 is provided with a receiving unit 100, a decoding unit 101, a data storage unit 103, a redecoding unit 105, a control unit 106, and a frame storage unit 112.

Figure 13:
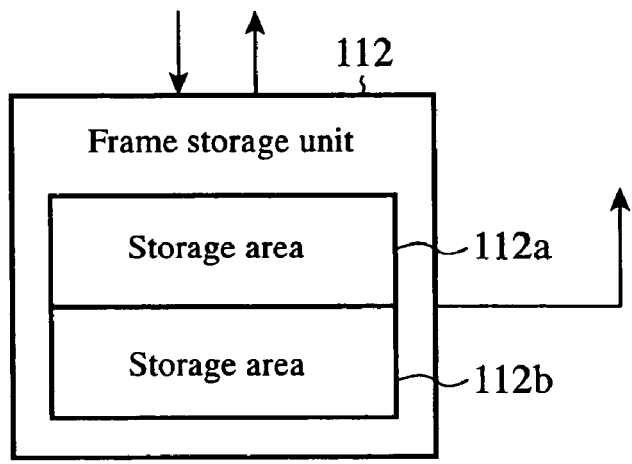
FIG. 13 is a diagram explaining the internal structure of a frame storage unit in a case where the moving image decoding apparatus in accordance with embodiment 4 of the present invention decodes an image frame with a high resolution.
Figure 14:
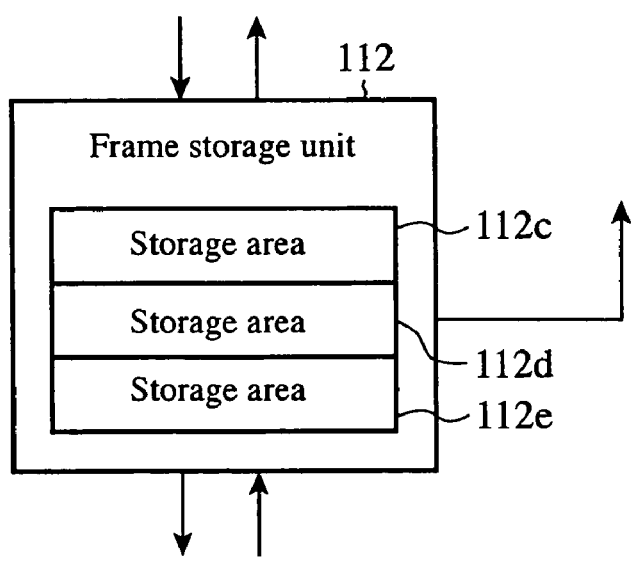
FIG. 14 is a diagram explaining the internal structure of a frame storage unit in a case where the moving image decoding apparatus in accordance with embodiment 4 of the present invention decodes an image frame with a standard resolution.

FIG. 13 is a diagram explaining the internal structure of the frame storage unit 112 when the decoding unit 101 decodes an image frame with a high resolution, and FIG. 14 is a diagram explaining the internal structure of the frame storage unit 112 when the decoding unit 101 decodes an image frame with a standard resolution.

In FIG. 12, the receiving unit 100 receives a plurality of types of image frames with a high or standard resolution from a transmission line, and, when the received image frames are image frames with the standard resolution, notifies receiving state information about a data loss and an error in coded data which constitutes each of the image frames, the decoding unit 101 decodes each of the image frames with the high or standard resolution received by the receiving unit 100 by referring to one or more image frames which have been decoded and which are needed for the decoding, the data storage unit 103 stores both an image frame with the standard resolution which consists of coded data having a data loss or error which is received by the receiving unit 100 and complementary coded data which is received by the receiving unit 100 at a later time and which is used for complementing the coded data having a data loss or error according to a command from the control unit 106 to which the receiving state information has been notified by the receiving unit 100, rearranges the coded data having a data loss or error and the complementary coded data into normal sequence to generate correct coded data, and stores an image frame with the standard resolution which consists of the correct coded data, the redecoding unit 105 decodes the image frame with the standard resolution stored in the data storage unit 103 by referring to one or more image frames which have been decoded and which are needed for the decoding, the frame storage unit 112 stores at least two already-decoded image frames with the high resolution each of which is an image frame which has been decoded by the decoding unit 101 and each of which is to be referred to when a subsequent image frame with the high resolution is decoded, and also stores at least three already-decoded image frames with the standard resolution each of which is an image frame which has been decoded by either the decoding unit 101 or the redecoding unit 105 and each of which is to be referred to when a subsequent image frame with the standard resolution is decoded, and the control unit 106 provides the above-mentioned command to the data storage unit 100 on the basis of the receiving state information notified thereto by the receiving unit 100, and instructs both the decoding unit 101 and the redecoding unit 105 to refer to one or more already-decoded image frames with the standard resolution and to store a decoded image frame with the standard resolution in the frame storage unit 112.

Furthermore, in FIG. 12, the receiving unit 100 receives either a plurality of types of first image frames each of which is to be decoded with reference to three or more already-decoded image frames or a plurality of types of second image frames each of which is to be decoded with reference to two already-decoded image frames from a transmission line, and, when receiving the second image frames, notifies receiving state information about a data loss and an error in coded data which constitutes each of the image frames, the decoding unit 101 decodes each of the first or second image frames received by the receiving unit 100 by referring to one or more image frames which have been decoded and which are needed for the decoding, the data storage unit 103 stores both a second image frame which consists of coded data having a data loss or error which is received by the receiving unit 100 and complementary coded data which is received by the receiving unit 100 at a later time and which is used for complementing the coded data having a data loss or error according to a command from a the control unit 106 to which the receiving state information has been notified by the receiving unit 100, rearranges the coded data having a data loss or error and the complementary coded data into normal sequence to generate correct coded data, and stores a second image frame which consists of the correct coded data, the redecoding unit 105 decodes the second image frame stored in the above-mentioned data storage unit by referring to one or more image frames which have been decoded and which are needed for the decoding, the frame storage unit 112 stores at least three already-decoded first image frames each of which is a first image frame which has been decoded by the decoding unit 101 and each of which is to be referred to when a subsequent first image frame is decoded, and also stores at least three already-decoded second image frames each of which is a second image frame which has been decoded by either the decoding unit 101 or the redecoding unit 105 and each of which is to be referred to when subsequent second image frames are decoded, and the control unit 106 provides the above-mentioned command to the data storage unit 103 on the basis of the receiving state information notified thereto by the receiving unit 100, and instructs both the decoding unit 101 and the redecoding unit 105 to refer to one or more already-decoded second image frames and to store a decoded second image frame in the frame storage unit 112.

In addition, in FIG. 12, the receiving unit 100 receives a plurality of types of image frames with a standard or low resolution having a lower number of pixels than that of the standard resolution from a transmission line, and, when the received image frames are image frames with the low resolution, notifies receiving state information about a data loss and an error in coded data which constitutes each of the image frames, the decoding unit 101 decodes each of the image frames with the standard or low resolution received by the receiving unit 100 by referring to one or more image frames which have been decoded and which are needed for the decoding, the data storage unit 103 stores both an image frame with the low resolution which consists of coded data having a data loss or error which is received by the receiving unit 100 and complementary coded data which is received by the receiving unit 100 at a later time and which is used for complementing the coded data having a data loss or error according to a command from the control unit 106 to which the receiving state information has been notified by the receiving unit 100, rearranges the coded data having a data loss or error and the complementary coded data into normal sequence to generate correct coded data, and stores an image frame with the standard resolution which consists of the correct coded data, the redecoding unit 105 decodes the image frame with the standard resolution stored in the data storage unit 103 by referring to one or more image frames which have been decoded and which are needed for the decoding, the frame storage unit 112 stores at least two already-decoded image frames with the standard resolution each of which is an image frame which has been decoded by the decoding unit 101 and each of which is to be referred to when a subsequent image frame with the standard resolution is decoded, and also stores at least three already-decoded image frames with the low resolution each of which is an image frame which has been decoded by either the decoding unit 101 or the redecoding unit 105 and each of which is to be referred to when subsequent image frames with the low resolution are decoded, and the control unit 106 provides the above-mentioned command to the data storage unit 103 on the basis of the receiving state information notified thereto by the receiving unit 100, and instructs both the decoding unit 101 and the redecoding unit 105 to refer to one or more already-decoded image frames with the low resolution and to store a decoded image frame with the low resolution in the frame storage unit 112.

Next, the operation of the moving image decoding apparatus in accordance with this embodiment of the present invention will be explained.

Related art moving image decoding apparatus fundamentally use the same structure as in the case where they decode an image with a standard resolution even when decoding an image with a high resolution. For this reason, when the moving image decoding apparatus in accordance with this embodiment operates like related art moving image decoding apparatus, the decoding unit 101 decodes coded data inputted thereto from a transmission line, and then performs reading and writing of decoded data from and into the frame storage unit 112 according to the type of a frame associated with the decoded data. For example, when the input image is an image in the form of MPEG2 Video, since a B frame having reference images at the front and back thereof as above-mentioned also exists, two storage areas which can store the two reference images, respectively, are disposed in the frame storage unit 112.

FIG. 13 shows the internal structure of the frame storage unit 112 in a case where the decoding unit decodes an image frame with a high resolution as before. Thus, the two storage areas 112*a* and 112*b* which can store two image frames with a high resolution are needed. When the moving image decoding apparatus in accordance with this embodiment thus operates like related art moving image decoding apparatus, since any redecoding process is not carried out, the redecoding unit 105 does not carry out any process of reading or writing coded data.

In a case of the decoding of a moving image with a standard resolution, since the number of pixels in the moving image with a standard resolution is smaller than that in an image with a high resolution, there can be few areas required for the frame storage unit 112. Therefore, by securing three storage areas 112*c*, 112*d*, and 112*e*, as shown in FIG. 14, the storage and reference of a redecoded image frame can be implemented by using the single frame storage unit 112, as in the case of above-mentioned embodiment 1.

Some video coding methods, such as a video coding method which complies with H.264, support not only the reference of two images in the front and back of an image to be decoded but also the reference of a plurality of images in the front and back of an image to be decoded. When the moving image decoding apparatus of this embodiment is so constructed as to comply with such a decoding method, it can store three or more image frames using the frame storage unit 112. When the moving image decoding apparatus handles moving image coded data which complies with such a coding method as an MPEG2 Video coding method, and which the decoding unit decodes with reference to two images, the moving image decoding apparatus only has to use vacant storage areas for reference images of the frame storage unit 112 when carrying out storage or redecoding of data, but does not need to have an additional frame storage unit.

When the moving image decoding apparatus of this embodiment is so constructed as to decode only moving images with a standard resolution, there can be a case where coded data about frame images whose pixel number is reduced for a purpose, such as a reduction in the bit rate, are inputted, and the size of decoded frame images are enlarged to their normal size so that they can be displayed on the screen of a display unit located at a later stage. When the moving image decoding apparatus decodes such coded data, since the size of a required storage area of the frame storage unit 112 can be reduced, if an area in which two images with a standard resolution can be secured, the area is divided into three parts so that the three areas can be secured in order to store frames whose pixel number is reduced, as in the case of the examples of FIGS. 13 and 14. As a result, the moving image decoding apparatus can carry out reading and writing of reference frames from and into the three regions of the frame storage unit 112 at the time of the redecoding of each I or P frame from which any error and any data loss are removed are removed without newly providing an additional frame storage unit.

As mentioned above, the moving image decoding apparatus in accordance with this embodiment 4 has the frame storage unit 112 and decoding unit 101 which are suited for the decoding of an image frame with a high resolution, and, when carrying out the decoding of an image frame with a standard resolution and the storage and redecoding of coded data which reaches the moving image decoding apparatus after a delay, secures three frame storage areas in the frame storage unit 112. Therefore, there is no necessity to provide an additional frame storage unit, and, when the frame storage unit is implemented via hardware, the circuit structure of the moving image decoding apparatus can be reduced in size, while when the frame storage unit is implemented via software, the memory consumption can be reduced.

Furthermore, when the moving image decoding apparatus in accordance with this embodiment 4 has the frame storage unit 112 and decoding unit 101 which need three or more reference frames at the time of the normal decoding of coded data, and carries out the storage and redecoding of image coded data having two reference frames, the moving image decoding apparatus uses a vacant reference frame storage area as an area from or into which the redecoding unit reads or writes a reference image at the time of the redecoding of each I or P frame from which any error and any data loss are removed. Also in this case, there is no necessity to provide an additional frame storage unit, and, when the frame storage unit is implemented via hardware, the circuit structure of the moving image decoding apparatus can be reduced in size, while when the frame storage unit is implemented via software, the memory consumption can be reduced.

In addition, when the moving image decoding apparatus in accordance with this embodiment 4 decodes coded data about an image frame whose pixel number is small, the size of each of the two storage areas for storing one frame in the frame storage unit 112 is reduced, and a further storage area, as well as the two storage areas, are used as areas from or into each of which the redecoding unit reads or writes a reference image at the time of the redecoding of each I or P frame from which any error and any data loss are removed. Also in this case, there is no necessity to provide an additional frame storage unit, and, when the frame storage unit is implemented via hardware, the circuit structure of the moving image decoding apparatus can be reduced in size, while when the frame storage unit is implemented via software, the memory consumption can be reduced.

Embodiment 5

In this embodiment 5, a moving image decoding apparatus having a function of transmitting a request signal associated with the nature of coded data transmitted thereto to a transmit side will be explained.

Figure 15:
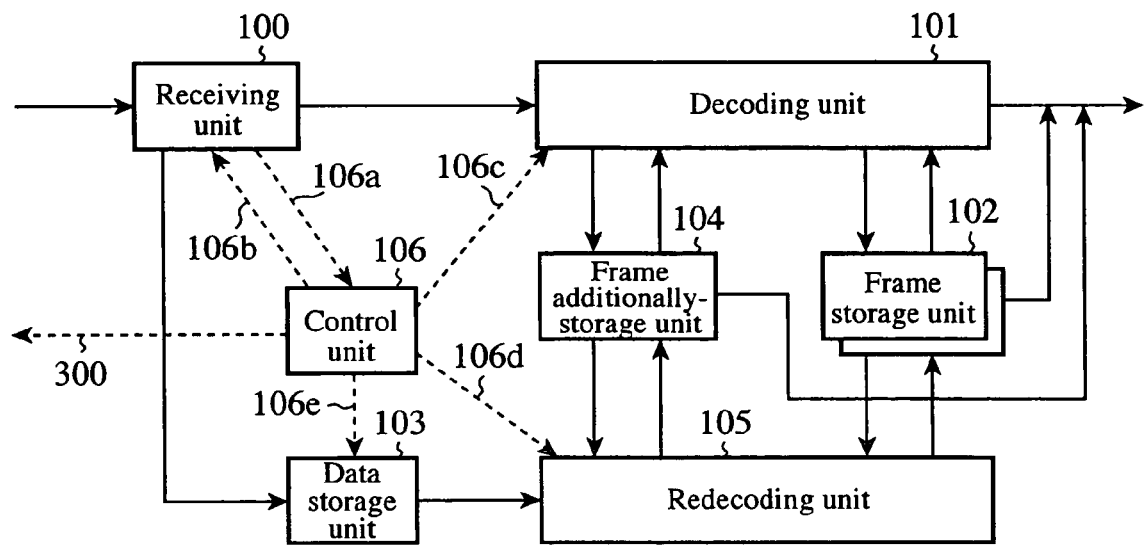
FIG. 15 is a block diagram showing the structure of a moving image decoding apparatus in accordance with embodiment 5 of the present invention.

FIG. 15 is a block diagram showing the structure of the moving image decoding apparatus in accordance with embodiment of the present invention. The moving image decoding apparatus in accordance with this embodiment 5 differs from that of above-mentioned embodiment 1 shown in FIG. 1 in that it additionally has a function of transmitting a request signal 300 to a transmit side using a control unit 106, and the other structure of the moving image decoding apparatus in accordance with this embodiment 5 is the same as that of the moving image decoding apparatus of embodiment 1 shown in FIG. 1.

In FIG. 15, the control unit 106 transmits a request signal indicating a request for retransmission of complementary coded data which is used to complement coded data having a data loss or error to the transmit side.

In FIG. 15, the control unit 106 also transmits a request signal indicating a request to increase or decrease the number of image frames each of which is to be decoded with reference to one or more other image frames according to the error rate of the received image frames to the transmit side.

Next, the operation of the moving image decoding apparatus in accordance with this embodiment of the present invention will be explained.

As shown also in FIG. 5 of above-mentioned embodiment 1, after decoding coded data having a data loss or error at a normal timing, the moving image decoding apparatus stores the coded data in a data storage unit 103 for a predetermined time period until complementary coded data which is used to complement the coded data having a data loss or error reaches the moving image decoding apparatus. In the meantime, the control unit 106 notifies, as a request signal 300, information about the coded data having a data loss or error to the transmit side by way of a transmission line connected between the moving image decoding apparatus and the transmit side so as to acquire the desired complementary coded data.

For example, when coded data is transmitted to the moving image decoding apparatus using a protocol, such as UDP, since a sequence number is given to each UDP packet, the control unit notifies the sequence number of any packet having a data loss or error which the moving image decoding apparatus was not able to receive correctly to the transmit side, and makes a request for retransmission of the packet. Any concrete procedure for transmitting the request signal 300 can be used. For example, the control unit can transmit the request to the transmit side according to TCP. When one or more relay nodes exist in the network between the transmit side and the receive side and a copy of every transmission data is held by one of the nodes, the relay node can respond to any request for retransmission of an erroneous packet instead of the transmit side.

As shown also in FIG. 6 of above-mentioned embodiment 2, the storage time during which coded data is stored in the data storage unit 103 changes according to the structure of reference frames and frames to be referred to until the redecoding of each I or P frame from which any data and any error are removed is started. In the example of FIG. 6, when there are two B frames between I and P frames in the first GOP (M value=3), the redecoded result of the I2' frame can be stored during a time period of 2 frame times long since the decoding of the I2 frame has been started. On the other hand, in the next GOP, when its M value is 2, the data storage time during which decoded data is stored until the leading I frame reaches the moving image decoding apparatus after a delay is equal to one frame time.

That is, the larger number of B frames, the longer time period during which erroneous coded data is stored in the data storage unit 103, and the arrival of complementary coded data after a delay is waited for before the redecoding of corresponding coded data is started. Therefore, there is a high possibility that the complementary coded data which is used to complement the erroneous decoded data can be acquired in time for the redecoding.

Therefore, the control unit transmits, as the above-mentioned request signal 300, a request signal indicating a request for setting of the number of reference frames in each coded data to the transmit side according to the error rate of received data and timing at which the received data reaches the moving image decoding apparatus after a delay. For example, when the error rate of received data is high, the control unit makes a request of the transmit side to increase the number of reference frames in each coded data so that the storage time during which coded data is stored in the data storage unit 103 becomes long. Furthermore, when the inputted image is, for example, an image in the form of MPEG2 Video, the control unit makes a request of the transmit side to increase the M value so that the number of B frames in GOP increases.

As mentioned above, when received coded data has a data loss or error, the moving image decoding apparatus in accordance with this embodiment 5 makes a request of the transmit side to retransmit the coded data. Therefore, the retransmission of such coded data is completed so that the coded data can reach the moving image decoding apparatus before the moving image decoding apparatus starts the redecoding of the coded data, and the degradation in the image quality of the redecoded image frame and that of subsequent image frames which are to be decoded with reference to the redecoded image frame can be reduced.

Furthermore, in accordance with this embodiment 5, when the error rate of received data is high or when the timing at which complementary coded data reaches the moving image decoding apparatus after a delay is delayed, the control unit makes a request of the transmit side to increase the number of reference frames in each coded data. Therefore, since the storage time during which coded data is stored in the data storage unit 103 becomes long, and a larger number of retransmission data can reach the moving image decoding apparatus in the meantime, the degradation in the image quality of the redecoded image frame and that of subsequent image frames which are to be decoded with reference to the redecoded image frame can be reduced.

Embodiment 6

In this embodiment 6, the operation of a moving image coding apparatus which is the transmit side at the time of receiving the request signal 300 from the receive side shown in above-mentioned embodiment 5 will be explained.

Figure 16:
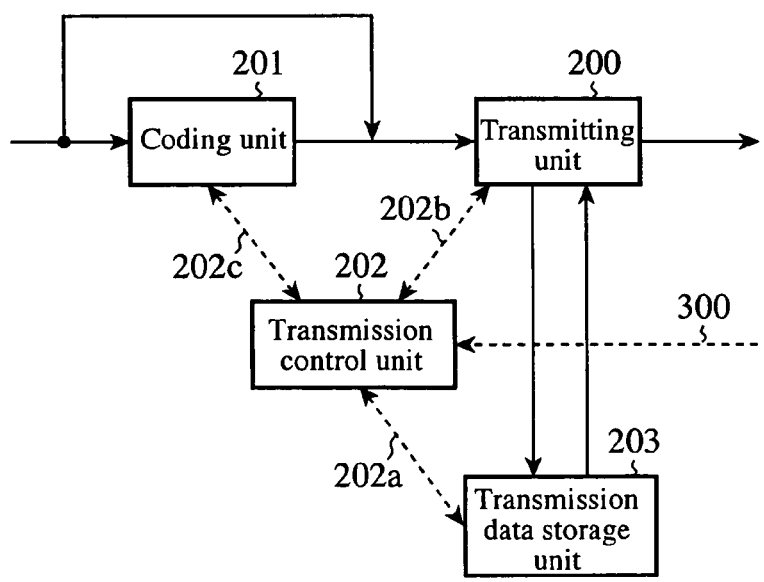
FIG. 16 is a block diagram showing the structure of a moving image coding apparatus in accordance with embodiment 6 of the present invention.

FIG. 16 is a block diagram showing the structure of the moving image coding apparatus in accordance with embodiment 6 of the present invention. This moving image coding apparatus is provided with a transmitting unit 200, a coding unit 201, a transmission control unit 202, and a transmission-data storage unit 203.

In FIG. 16, the coding unit 201 codes image data to be transmitted, forms a plurality of types of image frames with the coded image data, and outputs them, and the transmitting unit 200 transmits the plurality of types of image frames outputted by the coding unit 201. The transmission-data storage unit 203 stores image frames which are included in the plurality of types of mage frames transmitted by the transmitting unit 200 and each of which is to be referred to when the decoding side decodes coded data about an image frame, and the transmission control unit 202 receives a request signal 300 indicating a request for retransmission of complementary coded data which is used to complement coded data having a data loss or error from the decoding side, and makes the transmitting unit 200 transmit the complementary coded data about an image frame stored in the transmission-data storage unit 203.

In FIG. 16, the transmission control unit 202 also receives a request signal 300 indicating a request to increase or decrease the number of image frames each of which is to be decoded with reference to one or more other image frames from the decoding side, and instructs the coding unit 201 to change the frame structure of the plurality of types of image frames.

Next, the operation of the moving image coding apparatus in accordance with this embodiment of the present invention will be explained.

The coding unit 201 codes image data to be transmitted, and, after that, the transmitting unit 200 converts the coded image data into coded data in the form suitable for the transmission line, and transmits them to the receive side. When the inputted image data have been coded, the moving image coding apparatus can furnish them directly to the transmitting unit 200 without delivering the image data to the coding unit 201. The request signal 300 shown in above-mentioned embodiment 5 is inputted to the transmission control unit 202. When the request signal 300 indicates a request for retransmission of already-transmitted image data, the transmission control unit 202 sends retransmission data specification information 202a to the transmission-data storage unit 203 so as to read corresponding coded data, and also sends a retransmission instruction 202b to the transmitting unit 200 so as to make the transmitting unit 200 transmit the coded data onto the transmission line. To this end, while the transmission control unit 202 makes the transmitting unit 200 transmit coded data about a frame to be referred to which can be the target for redecoding in the receive side to the transmission line, as mentioned above, it is necessary to store the coded data in the transmission-data storage unit 203 for a fixed time period in preparation for a request for retransmission of the coded data.

The storage time during which coded data is store in the transmission-data storage unit 203 can be a fixed time period which is determined in consideration of factors including the capacity of the transmission-data storage unit 203. Like the data storage time shown in above-mentioned embodiment 2 which is defined in the receive side, the storage time during which coded data is store in the transmission-data storage unit 203 can be varied according to the structure of reference frames and frames to be referred to associated with coded data transmitted to the receive side, and the decoding time of the receive side.

When the request signal 300 inputted to the transmission control unit 202 indicates a request for formation of the frame structure of coded data, i.e., a request to change the structure of reference frames, the transmission control unit 202 sends a coding control signal 202c to the coding unit 201 so as to instruct the coding unit 201 to form frames with the coded data. When the inputted image data have been coded and have a structure which does not suit the request from the receive side, the transmission control unit 202 can temporarily decode the image data and then make the coding unit 201 recode the decoded image data so that they have a frame structure which suits the request from the receive side.

As mentioned above, in accordance with this embodiment 6, the transmit side is provided with the transmission control unit 202 which receives and analyzes the request signal 300 indicating a request for retransmission of coded data, holds coded data which can be the target for retransmission, and retransmits the coded data to the receive side according to a request for retransmission of the coded data from the receive side. Therefore, since the receive side can receive the coded data retransmitted thereto which is used to complement corresponding coded data having an error or data loss when redecoding the coded data, the degradation in the image quality of the redecoded image frame and that of subsequent image frames which are to be decoded with reference to the redecoded image frame can be reduced.

Furthermore, in accordance with this embodiment 6, the transmit side is provided with the transmission control unit 202 which receives and analyzes the request signal 300 indicating a request to change the frame structure of coded data, and the coding unit 201 changes the structure of the reference frames and frames to be referred to in the image frames according to the request signal. Therefore, since the receive side can adjust the time required to receive the coded data retransmitted thereto which is used to complement corresponding coded data having an error or data loss, the degradation in the image quality of the redecoded image frame and that of subsequent image frames which are to be decoded with reference to the redecoded image frame can be reduced.

Embodiment 7

In accordance with this embodiment 7, there is provided a moving image coding apparatus which generates coded data having a predetermined data structure so as to enable a receive side to shorten a delay time which elapses until the receive side performs the display of the coded data since it has received the coded data.

The moving image coding apparatus in accordance with this embodiment 7 of the present invention has the same structure as that of above-mentioned embodiment 6 shown in the block diagram of FIG. 16.

In this embodiment 7, when outputting a leading image frame which does not include inter-frame prediction to a coding unit 201, a transmission control unit 202 codes a part of image data to be transmitted with a low resolution and outputs it, and, after that, instructs the coding unit 201 to code the remainder of the image data to be transmitted with a standard resolution and output it.

Figure 17:
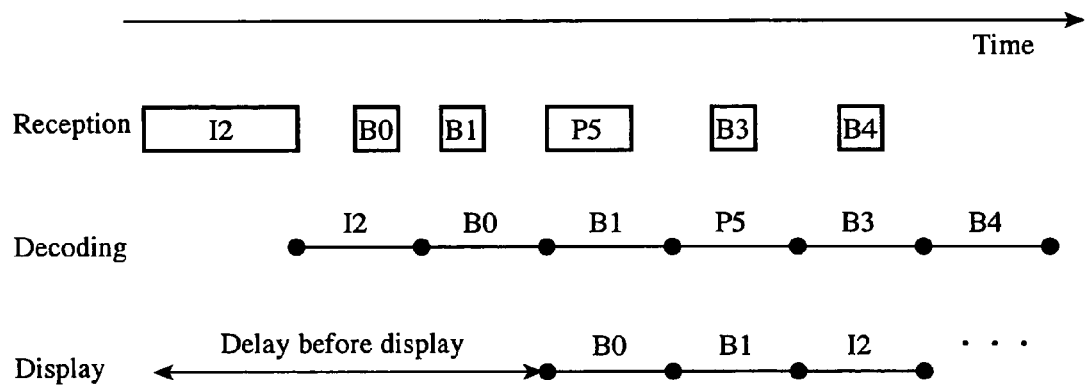
FIG. 17 is a diagram showing a processing sequence of a moving image decoding apparatus in accordance with embodiment 7 of the present invention when receiving, decoding and displaying coded data.
Figure 18:
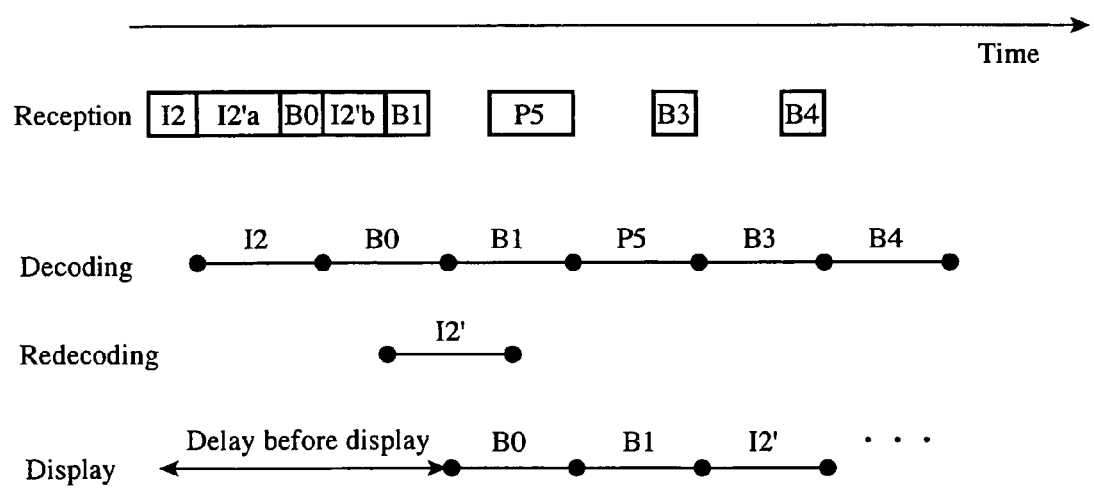
FIG. 18 is a diagram showing a processing sequence of the moving image decoding apparatus in accordance with embodiment 7 of the present invention when receiving, decoding and displaying coded data.

FIGS. 17 and 18 are diagrams showing a processing sequence at the time of receiving, decoding, and displaying coded data of a moving image decoding apparatus in accordance with embodiment 7 of the present invention. FIG. 17 shows a case where the inputted coded data have a normal data configuration, and FIG. 18 shows a case of the inputted coded data have a data configuration inherent in this embodiment 7.

Next, the operations of the moving image coding apparatus and moving image decoding apparatus in accordance with this embodiment of the present invention and will be explained.

In FIG. 17, coded data inputted to a receiving unit 100 of the moving image decoding apparatus have a normal data configuration, and comply with a coding method such as an MPEG2 Video coding method, as in the above-mentioned embodiments. In general, in a case where a coding method including inter-frame-prediction coding is used, since the leading I frame does not include inter frame prediction, it has a larger coded data size than other frames. Therefore, the time required to complete the reception of the leading I2 frame and to start the decoding of this frame is relatively long, but dependently upon the size of the I2 frame.

On the other hand, in FIG. 18, coded data inputted to the receiving unit 100 of the moving image decoding apparatus have a data configuration inherent in this embodiment 7. A coding unit 201 of the moving image coding apparatus codes the leading I frame twice, and sends out the coded I frame. At that time, the coding unit 201 codes the I frame with a low resolution for the first time to generate an I2 frame whose image quality is made to be low and whose coded data size is made to be small, and codes the I frame with a standard resolution for a second time to generate an I2' frame (which is divided into an I2'a frame and an I2'b frame when transmitted) having normal image quality and having a normal coded data size (which is the same as that of the I2 frame of FIG. 17).

The moving image coding apparatus transmits these two types of I frames and subsequent normal coded data to the moving image decoding apparatus. The moving image coding apparatus sends out the I2 frame of a small size first, and then sends out the I2' frame of a normal size. At this time, in the example of FIG. 18, while the moving image coding apparatus transmits coded data about the B0 and B1 frames by the time when the moving image decoding apparatus starts decoding the B0 and B1 frames, respectively, the moving image coding apparatus needs to send out the I2' frame by the time when the moving image decoding apparatus starts decoding the P5 frame so that the moving image decoding apparatus can redecode the I2' frame. In the example of FIG. 18, the moving image coding apparatus divides the I2' frame into two parts so that the I2'a and I2'b frames can be sent out before and after the B0 frame, respectively.

The receive side starts decoding the inputted image promptly after completing the reception of the I2 frame with a low resolution. Since the coded data size of the I2 frame is relatively small as shown in FIG. 18, the receive side can start decoding the I2 frame at an earlier time as compared with the case of FIG. 17. Then, the receive side stores the received I2' frame with a standard resolution in a data storage unit 103 in parallel with the decoding of each of the B0 and B1 frames which the receive side has sequentially received after receiving the I2 frame, and a redecoding unit 105 performs the decoding of the I2' frame after it has received all of the I2' frame.

Then, in the example of FIG. 18, since the reference image is the I2 frame when each of the B0 and B1 frames is decoded, each of the decoded B0 and B1 image frames has a low resolution. On the other hand, since the decoding of the I2' frame is completed before the decoding of the P5 frame is started, the decoded P5 frame can have a normal image quality, like that shown in FIG. 17. That is, although each of the leading decoded B0 and B1 image frames has a low image quality in terms of the display order of the image frames, the subsequent image frames can be played back with a normal image quality.

The transmit side can generate the coded data in this embodiment 7 in real time at the time of sending out them. As an alternative, the coded data which have been coded using a coding method in accordance with the present invention are prestored in the transmit side, and the transmit side can only transmit the coded data to the receive side.

As mentioned above, in accordance with this embodiment 7, when outputting a leading image frame which does not include inter-frame prediction to the coding unit 201, the transmission control unit 202 codes a part of image data to be transmitted with a low resolution and outputs it, and, after that, instructs the coding unit 201 to code the remainder of the image data to be transmitted with a standard resolution and output it. Therefore, the receive side can receive the part of image data with a low resolution after a short delay time, and can decode and display the image data, and can reduce the degradation in the quality of the decoded image by replacing the part of image data with a low resolution with image data with a normal resolution which it has received at a later time.

Many widely different embodiments of the present invention may be constructed without departing from the spirit and scope of the present invention. It should be understood that the present invention is not limited to the specific embodiments described in the specification, except as defined in the appended claims.

What is claimed is:

1. A moving image decoding apparatus comprising:
a receiving unit for receiving a plurality of types of image frames from a transmission line, and for notifying receiving state information about occurrence of a data loss or error in coded data which constitute each of the image frames;
a decoding unit for decoding each of the plurality of types of image frames received by said receiving unit by referring to one or more image frame which have been decoded and which are required for the decoding;
a data storage unit for storing both an image frame which consists of coded data having a data loss or error, which is received by said receiving unit, and complementary coded data, which is received by said receiving unit at a later time and which is used for complementing the coded data having a data loss or error, according to a command from a below-mentioned control unit to which the receiving state information has been notified by said receiving unit, for rearranging the coded data and the complementary coded data into normal sequence to generate normal coded data, and for storing an image frame which consists of the normal coded data;
a redecoding unit for decoding the image frame stored in said data storage unit by referring to one or more image frames which have been decoded and which are required for the decoding;
a frame storage unit for storing at least two already-decoded image frames each of which is an image frame which has been decoded by either said decoding unit or said redecoding unit, and each of which is referred to when a subsequent image frame is decoded;
a frame additionally-storage unit for storing at least one already-decoded image frame which is an image frame which has been decoded by either said decoding unit or said redecoding unit and which is referred to when a subsequent image frame is decoded; and
said control unit for providing said command to said data storage unit on the basis of the receiving state information notified thereto by said receiving unit, and for instructing both said decoding unit and said redecoding unit to refer to an already-decoded image frame and to store a decoded image frame in either said frame storage unit and said frame additionally-storage unit.

2. The moving image decoding apparatus according to claim 1, wherein when an image frame consists of coded data having a data loss or error and is to be referred by both said decoding unit and said redecoding unit when decoding another image frame, said control unit stores the image frame consists of the coded data in said data storage unit.

3. The moving image decoding apparatus according to claim 2, wherein when an image frame consists of coded data having a data loss or error and can be decoded independently by both said decoding unit and said redecoding unit without referring to preceding and subsequent image frames when decoding the image frame, said control unit stores the image frame consists of the coded data in said data storage unit.

4. The moving image decoding apparatus according to claim 1, wherein when said receiving unit receives the complementary coded data, said control unit instructs said decoding unit to stop decoding an image frame by referring to one or more image frames which have been decoded.

5. The moving image decoding apparatus according to claim 1, wherein said receiving unit analyzes a frame structure of the plurality of types of image frames, and notifies data structure information about the frame structure to said control unit, and said control unit controls storage times when image frames are stored in said data storage unit on the basis of the data structure information notified thereto by said receiving unit.

6. The moving image decoding apparatus according to claim 1, wherein said decoding unit notifies a length of decoding time required to decode each of the plurality of types of image frames to said control unit, and said control unit controls storage times when image frames are stored in said data storage unit on the basis of the length of decoding time notified thereto by said decoding unit.

7. The moving image decoding apparatus according to claim 1, wherein said frame additionally-storage unit stores at least two already-decoded image frames.

8. The moving image decoding apparatus according to claim 1, wherein said control unit transmits a request signal for making a request for retransmission of the complementary coded data which is used to complement the coded data having a data loss or error to a transmit side which has transmitted the plurality of types of image frames to said moving image decoding apparatus.

9. The moving image decoding apparatus according to claim 1, wherein said control unit transmits a request signal for making a request to increase or decrease a number of image frames each of which is to be decoded with reference to one or more other image frames to a transmit side which has transmitted the plurality of types of image frames to said moving image decoding apparatus according to an error rate of the received plurality of types of image frames.

10. A moving image decoding apparatus comprising:
a receiving unit for receiving a plurality of types of image frames with a high or standard resolution from a transmission line, and for, when the received image frames are image frames with the standard resolution, notifying receiving state information about occurrence of a data loss or error in coded data which constitutes each of the image frames;
a decoding unit for decoding each of the image frames with the high or standard resolution received by said receiving unit by referring to one or more image frames which have been decoded and which are needed for the decoding;

a data storage unit for storing both an image frame with the standard resolution which consists of coded data having a data loss or error, which is received by said receiving unit, and complementary coded data, which is received by said receiving unit at a later time and which is used for complementing the coded data having a data loss or error, according to a command from a below-mentioned control unit to which the receiving state information has been notified by said receiving unit, for rearranging the coded data having a data loss or error and the complementary coded data into normal sequence to generate correct coded data, and for storing an image frame with the standard resolution which consists of the correct coded data;

a redecoding unit for decoding the image frame with the standard resolution stored in said data storage unit by referring to one or more image frames which have been decoded and which are needed for the decoding;

a frame storage unit for storing at least two already-decoded image frames with the high resolution each of which is an image frame which has been decoded by said decoding unit and each of which is to be referred to when a subsequent image frame with the high resolution is decoded, and for storing at least three already-decoded image frames with the standard resolution each of which is an image frame which has been decoded by either said decoding unit or said redecoding unit and which is to be referred to when a subsequent image frame with the standard resolution is decoded; and said control unit for providing said command to said data storage unit on the basis of the receiving state information notified thereto by said receiving unit, and for instructing both said decoding unit and said redecoding unit to refer to one or more already-decoded image frames with the standard resolution and to store a decoded image frame with the standard resolution in said frame storage unit.

11. The moving image decoding apparatus according to claim 10, wherein said control unit transmits a request signal for making a request for retransmission of the complementary coded data which is used to complement the coded data having a data loss or error to a transmit side which has transmitted the plurality of types of image frames to said moving image decoding apparatus.

12. The moving image decoding apparatus according to claim 10, wherein said control unit transmits a request signal for making a request to increase or decrease a number of image frames each of which is to be decoded with reference to one or more other image frames to a transmit side which has transmitted the plurality of types of image frames to said moving image decoding apparatus according to an error rate of the received plurality of types of image frames.

13. A moving image decoding apparatus comprising:
a receiving unit for receiving either a plurality of types of first image frames each of which is to be decoded with reference to three or more already-decoded image frames or a plurality of types of second image frames each of which is to be decoded with reference to two already-decoded image frames from a transmission line, and for, when receiving said second image frames, notifying receiving state information about occurrence of a data loss or error in coded data which constitutes each of the image frames;

a decoding unit for decoding each of the first or second image frames received by said receiving unit by referring to one or more image frames which have been decoded and which are needed for the decoding;

a data storage unit for storing both a second image frame which consists of coded data having a data loss or error, which is received by said receiving unit, and complementary coded data, which is received by said receiving unit at a later time and which is used for complementing the coded data having a data loss or error, according to a command from a below-mentioned control unit to which the receiving state information has been notified by said receiving unit, for rearranging the coded data having a data loss or error and the complementary coded data into normal sequence to generate correct coded data, and for storing a second image frame which consists of the correct coded data;

a redecoding unit for decoding the second image frame stored in said data storage unit by referring to one or more image frames which have been decoded and which are needed for the decoding;

a frame storage unit for storing at least three already-decoded first image frames each of which is a first image frame which has been decoded by said decoding unit and each of which is to be referred to when a subsequent first image frame is decoded, and for storing at least three already-decoded second image frames each of which is a second image frame which has been decoded by either said decoding unit or said redecoding unit and each of which is to be referred to when a subsequent second image frame is decoded; and said control unit for providing said command to said data storage unit on the basis of the receiving state information notified thereto by said receiving unit, and for instructing both said decoding unit and said redecoding unit to refer to one or more already-decoded second image frames and to store a decoded second image frame in said frame storage unit.

14. The moving image decoding apparatus according to claim 13, wherein said control unit transmits a request signal for making a request for retransmission of the complementary coded data which is used to complement the coded data having a data loss or error to a transmit side which has transmitted the plurality of types of image frames to said moving image decoding apparatus.

15. The moving image decoding apparatus according to claim 13, wherein said control unit transmits a request signal for making a request to increase or decrease a number of image frames each of which is to be decoded with reference to one or more other image frames to a transmit side which has transmitted the plurality of types of image frames to said moving image decoding apparatus according to an error rate of the received plurality of types of image frames.

16. A moving image decoding apparatus comprising:
a receiving unit for receiving a plurality of types of image frames with a standard or low resolution having a lower number of pixels than that of the standard resolution from a transmission line, and for, when the received image frames are image frames with the low resolution, notifying receiving state information about occurrence of a data loss or error in coded data which constitutes each of the image frames;

a decoding unit for decoding each of the image frames with the standard or low resolution received by said receiving unit by referring to one or more image frames which have been decoded and which are needed for the decoding;

a data storage unit for storing both an image frame with the low resolution which consists of coded data having a data loss or error, which is received by said receiving unit, and complementary coded data, which is received by said receiving unit at a later time and which is used for complementing the coded data having a data loss or error, according to a command from a below-mentioned control unit to which the receiving state information has been notified by said receiving unit, for rearranging the coded data having a loss or an error and the complementary coded data into normal sequence to generate correct coded data, and for storing an image frame with the standard resolution which consists of the correct coded data;

a redecoding unit for decoding the image frame with the standard resolution stored in said data storage unit by referring to one or more image frames which have been decoded and which are needed for the decoding;

a frame storage unit for storing at least two already-decoded image frames with the standard resolution each of which is an image frame which has been decoded by said decoding unit and each of which is to be referred to when a subsequent image frame with the standard resolution is decoded, and for storing at least three already-decoded image frames with the low resolution each of which is an image frame which has been decoded by either said decoding unit or said redecoding unit and each of which is to be referred to when a subsequent image frame with the low resolution is decoded; and said control unit for providing said command to said data storage unit on the basis of the receiving state information notified thereto by said receiving unit, and for instructing both said decoding unit and said redecoding unit to refer to one or more already-decoded image frames with the low resolution and to store a decoded image frame with the low resolution in said frame storage unit.

17. The moving image decoding apparatus according to claim 16, wherein said control unit transmits a request signal for making a request for retransmission of the complementary coded data which is used to complement the coded data having a data loss or error to a transmit side which has transmitted the plurality of types of image frames to said moving image decoding apparatus.

18. The moving image decoding apparatus according to claim 16, wherein said control unit transmits a request signal for making a request to increase or decrease a number of image frames each of which is to be decoded with reference to one or more other image frames to a transmit side which has transmitted the plurality of types of image frames to said moving image decoding apparatus according to an error rate of the received plurality of types of image frames.

* * * * *